US012739928B2

(12) United States Patent
Orsino et al.

(10) Patent No.: US 12,739,928 B2
(45) Date of Patent: Sep. 15, 2026

(54) WIRELESS DEVICE, NETWORK NODE AND METHODS PERFORMED THEREBY FOR HANDLING TRANSMISSION OF DATA

(71) Applicant: Telefonaktiebolaget LM Ericsson (publ), Stockholm (SE)

(72) Inventors: Antonino Orsino, Kirkkonummi (FI); Tuomas Tirronen, Helsinki (FI); Mattias Bergström, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 192 days.

(21) Appl. No.: 18/724,687

(22) PCT Filed: Apr. 17, 2023

(86) PCT No.: PCT/SE2023/050350

§ 371 (c)(1),
(2) Date: Jun. 27, 2024

(87) PCT Pub. No.: WO2023/204747

PCT Pub. Date: Oct. 26, 2023

(65) Prior Publication Data

US 2025/0071848 A1 Feb. 27, 2025

Related U.S. Application Data

(60) Provisional application No. 63/363,182, filed on Apr. 19, 2022.

(51) Int. Cl.
*H04W 76/23* (2018.01)
*H04W 74/0833* (2024.01)
(Continued)

(52) U.S. Cl.
CPC ....... *H04W 76/23* (2018.02); *H04W 74/0833* (2013.01); *H04W 76/27* (2018.02); *H04W 74/0836* (2024.01)

(58) Field of Classification Search
CPC ................. H04W 76/23; H04W 76/27; H04W 74/0833; H04W 74/0836
(Continued)

(56) References Cited

U.S. PATENT DOCUMENTS

2020/0092685 A1* 3/2020 Fehrenbach ............ H04W 4/08
2020/0100088 A1* 3/2020 Kim ...................... H04W 48/16
(Continued)

FOREIGN PATENT DOCUMENTS

WO WO-2018131956 A1 * 7/2018 ........ H04W 36/0033
WO WO-2020064773 A1 * 4/2020 ............ H04W 76/28
WO 2022045949 A1 3/2022

OTHER PUBLICATIONS

"3GPP TS 38.213 V17.1.0", 3rd Generation Partnership Project; Technical Specification Group Radio Access Network; NR; Physical layer procedures for control (Release 17), Mar. 2022, pp. 1-245.
(Continued)

*Primary Examiner* — Anthony Mejia
(74) *Attorney, Agent, or Firm* — Murphy, Bilak & Homiller, PLLC

(57) ABSTRACT

A method performed by a wireless device (130) first wireless device (131). The method is for handling transmission of data. The first wireless device (131) operates in a wireless communications network (100). The first wireless device (131) obtains (802) a first indication indicating a trigger to transmit data to a network node (110), in inactive state. A size of a buffer comprising the data is smaller than a threshold. The first wireless device (131) holds a first connection to the network node (110) via a second wireless device (132). The first wireless device (131) then refrains (805) from sending the data to the network node (110) in inactive state via the second wireless device (132). The refraining is based on the first wireless device (131) holding
(Continued)

the first connection to the network node (110) via the second wireless device (132).

20 Claims, 15 Drawing Sheets

(51) Int. Cl.
*H04W 76/27* (2018.01)
*H04W 74/0836* (2024.01)

(58) Field of Classification Search
USPC .......................................................... 370/328
See application file for complete search history.

(56) References Cited

U.S. PATENT DOCUMENTS

2024/0224199 A1* 7/2024 Christoffersson ..... H04W 52/44
2024/0349099 A1* 10/2024 Koskinen ............. H04W 24/10

OTHER PUBLICATIONS

"3GPP TS 38.321 V17.0.0", 3rd Generation Partnership Project; Technical Specification Group Radio Access Network; NR; Medium Access Control (MAC) protocol specification (Release 17), Mar. 2022, pp. 1-221.

"3rd Generation Partnership Project; Technical Specification Group Services and System Aspects; Study on system enhancement for Proximity based Services (ProSe) in the 5G System (5GS) (Release 17)", 3GPP TR 23.752 V17.0.0, Mar. 2021, pp. 1-183.

* cited by examiner a)

b)

WIRELESS DEVICE, NETWORK NODE AND METHODS PERFORMED THEREBY FOR HANDLING TRANSMISSION OF DATA

TECHNICAL FIELD

The present disclosure relates generally to a wireless device and methods performed thereby for handling transmission of data. The present disclosure further relates generally to a network node and methods performed thereby, for handling the transmission of data.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., gNB, evolved Node B ("eNB"), "eNodeB", "NodeB", "B node", Transmission Point (TP), or Base Transceiver Station (BTS), depending on the technology and terminology used. The base stations may be of different classes such as e.g., Wide Area Base Stations, Medium Range Base Stations, Local Area Base Stations, Home Base Stations, pico base stations, etc. . . . , based on transmission power and thereby also cell size. A cell may be understood to be the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also be a non-cellular system, comprising network nodes which may serve receiving nodes, such as wireless devices, with serving beams. In 3rd Generation Partnership Project (3GPP), Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

The standardization organization 3GPP is currently in the process of specifying a New Radio Interface called NR or 5G-UTRA, as well as a Fifth Generation (5G) Packet Core Network, which may be referred to as Next Generation (NG) Core Network, abbreviated as NG-CN, NGC or 5G CN.

Internet of Things (IoT)

The Internet of Things (IoT) may be understood as an internetworking of communication devices, e.g., physical devices, vehicles, which may also be referred to as "connected devices" and "smart devices", buildings and other items-embedded with electronics, software, sensors, actuators, and network connectivity that may enable these objects to collect and exchange data. The IoT may allow objects to be sensed and/or controlled remotely across an existing network infrastructure.

"Things," in the IoT sense, may refer to a wide variety of devices such as heart monitoring implants, biochip transponders on farm animals, electric clams in coastal waters, automobiles with built-in sensors, DNA analysis devices for environmental/food/pathogen monitoring, or field operation devices that may assist firefighters in search and rescue operations, home automation devices such as the control and automation of lighting, heating, e.g. a "smart" thermostat, ventilation, air conditioning, and appliances such as washer, dryers, ovens, refrigerators or freezers that may use telecommunications for remote monitoring. These devices may collect data with the help of various existing technologies and then autonomously flow the data between other devices.

It is expected that in a near future, the population of IoT devices will be very large. Various predictions exist, among which one assumes that there will be >60000 devices per square kilometer, and another assumes that there will be 1000000 devices per square kilometer. A large fraction of these devices is expected to be stationary, e.g., gas and electricity meters, vending machines, etc.

Machine Type Communication (MTC)

Machine Type Communication (MTC) has in recent years, especially in the context of the Internet of Things (IoT), shown to be a growing segment for cellular technologies. An MTC device may be a communication device, typically a wireless communication device or simply user equipment, that is, a self and/or automatically controlled unattended machine and that is typically not associated with an active human user in order to generate data traffic. An MTC device may be typically simpler, and typically associated with a more specific application or purpose than, and in contrast to, a conventional mobile phone or smart phone. MTC involves communication in a wireless communication network to and/or from MTC devices, which communication typically may be of quite different nature and with other requirements than communication associated with e.g., conventional mobile phones and smart phones. In the context of and growth of the IoT, it is evident that MTC traffic will be increasing and thus needs to be increasingly supported in wireless communication systems.

Small Data Transmission

Small data approaches have earlier been introduced in LTE with the focus on MTC. For example, Rel-15 Early Data Transmission (EDT) and Rel-16 Preconfigured Uplink Resources (PUR) have been standardized for LTE-MTC (LTE-M) and NarrowBand Internet of Things (NB-IoT). Unlike these features, the Rel-17 Small Data for NR may be understood to not be directly targeting MTC use cases and the Work Item Description (WID) may include smartphone background traffic as the justification.

The Work Item (WI) objectives outline two main objectives: Random Access Channel (RACH)-based schemes and pre-configured Physical Uplink Shared Channel (PUSCH) resources. Comparing to LTE-M and NB-IoT, the 4-step RACH-based scheme may be understood to be similar to Rel-15 User Plane (UP)-Early Data Transmission (EDT) and pre-configured PUSCH resources may be understood to be similar to Rel-16 UP-PUR. Further, the Rel-17 Small Data may only concern data transmission in INACTIVE state and hence, Control Plane (CP)-optimizations of EDT and PUR may be understood to so far not be relevant. 2-step RACH has not been specified for LTE, and hence there is no LTE counterpart for 2-step RACH-based Small Data.

The 4-step RA type has been used in Fourth Generation (4G) LTE and is also the baseline for Fifth Generation (5G) NR. The principle of this procedure in NR is shown in the schematic signalling diagram depicted in FIG. 1.

Step 1: Preamble Transmission 1

The UE may randomly select a Random Access (RA) preamble (PREAMBLE_INDEX) corresponding to a selected Synchronization Signal (SS)/Physical Broadcast Channel (PBCH) block, transmit the preamble on the Physical RACH (PRACH) occasion mapped by the selected SS/PBCH block. When the gNB detects the preamble, it may estimate the Timing advance (TA) the UE may need to use in order to obtain Uplink (UL) synchronization at the gNB.

Step 2: RA Response (RAR)

The gNB may send a RA response (RAR) including the TA, the Temporary Cell Radio Network Temporary Identifier (TC-RNTI), a temporary identifier, to be used by the UE, a Random Access Preamble identifier that may match the transmitted PREAMBLE_INDEX and a grant for Msg3. The UE may expect the RAR and thus, may monitor the Physical Downlink Control Channel (PDCCH) addressed to the Random Access (RA)-Radio Network Temporary Identifier (RNTI) to receive the RAR message from the gNB until the configured RAR window, e.g., the ra-Response-Window, may have expired, or until the RAR may have been successfully received.

According to 3GPP TS 38.321, v. 17.0.0: "The MAC entity may stop ra-ResponseWindow (and hence monitoring for Random Access Response(s)) after successful reception of a Random Access Response containing Random Access Preamble identifiers that matches the transmitted PREAMBLE_INDEX."

Step 3: "Msg3", UE ID or UE-Specific C-RNTI

In Msg3, the UE may transmit its identifier, e.g., UE ID, or more exactly the initial part of the 5G-Temporary Mobile Subscriber Identity (TMSI) for initial access or, if it is already in RRC_CONNECTED or RRC_INACTIVE mode and may need to e.g., re-synchronize, its UE-specific RNTI.

If the gNB cannot decode Msg3 at the granted Uplink (UL) resources, it may send a Downlink Control Information (DCI) addressed to the TC-RNTI for retransmission of the Msg3. Hybrid automatic repeat request (HARQ) retransmission may be requested until the UEs may restart the random access procedure from step 1 after reaching the maximum number of HARQ retransmissions, or until Msg3 may be successfully received by the gNB.

Step 4: "Msg4", Contention Resolution

In Msg4, the gNB may respond by acknowledging the UE Identifier (ID) or C-RNTI. The Msg4 may give contention resolution, that is, only one UE ID or C-RNTI may be sent, even if several UEs may have used the same preamble, and the same grant for Msg3 transmission, simultaneously.

For Msg4 reception, the UE may monitor TC-RNTI, if it transmitted its UE ID in Msg3, or C-RNTI, if it transmitted its C-RNTI in Msg3.

The 2-step RA type may be understood to give much shorter latency than the ordinary 4-step RA. The 2-step RA procedure is depicted in the schematic signalling diagram shown in FIG. 2. In the 2-step RA, the preamble and a message corresponding to Msg3, which may be referred to as msgA PUSCH, in the 4-step RA may, depending on configuration, be transmitted in two subsequent slots at 21. The msgA PUSCH may be sent on a resource dedicated to the specific preamble. This may be understood to mean that both the preamble and the Msg3 may face contention, but contention resolution in this case may be understood to mean that either both preamble and Msg 3 may be sent without collision, or both may collide.

Upon successful reception of the msgA, the gNB may respond with a msgB at 22. The msgB may be either a "successRAR", "fallbackRAR or "Back off". The content of msgB has been agreed as seen below. It may be noted in particular that fallbackRAR may provide a grant for a Msg3 PUSCH that may identify resources in which the UE may need to transmit the PUSCH, as well as other information.

Note: The notations "msgA" and "MsgA" are used interchangeably herein to denote message A. Similarly, the notations "msgB" and "MsgB" are used interchangeably herein to denote message B.

The possibility to replace the 4-step message exchange by a 2-step message exchange may lead to reduced RA latency. On the other hand, the 2-step RA may consume more resources since it may be understood to use contention-based transmission of the data. This may be understood to mean that the resources that may be configured for the data transmission may often be unused. Another difference is that 2-step RA may operate without a timing advance (TA), since there is no feedback from the gNB on how to adjust the uplink synchronization before the data payload may be transmitted in MsgA Physical Uplink Shared Channel (PUSCH).

If both the 4-step and 2-step RA are configured in a cell on shared PRACH resources, and for the UE, the UE may choose its preamble from one specific set if it wants to do a 4-step RA, and from another set if it wants to do a 2-step RA. Hence a preamble partition may be done to distinguish between 4-step and 2-step RA when shared PRACH resources may be used. Alternatively, the PRACH configurations may be different for the 2-step and 4-step RA procedure, in which case it may be deduced from where the preamble transmission May be done, if the UE is doing a 2-step or 4-step procedure.

In the 3GPP Rel-16 2-step RA type procedure, UEs may be informed of the potential time-frequency resources where they may transmit MsgA PRACH and MsgA PUSCH via higher layer signaling from the network. PRACH may be transmitted in periodically recurring RACH occasions (ROs), while PUSCH may be transmitted in periodically recurring PUSCH occasions (POs). PUSCH occasions may be described in MsgA PUSCH configurations provided by higher layer signaling. Each MsgA PUSCH configuration may define a starting time of the PUSCH occasions which may be measured from the start of a corresponding RACH occasion. Multiple PUSCH occasions may be multiplexed in time and frequency in a MsgA PUSCH configuration, where POs in an Orthogonal Frequency Division Multiplexing (OFDM) symbol may occupy a given number of Physical Resource Blocks (PRBs) and may be adjacent in frequency, and where POs may occupy 'L' contiguous OFDM symbols.

POs multiplexed in time in a MsgA PUSCH configuration may be separated by a configured gap 'G' symbols long. The start of the first occupied OFDM symbol in a PUSCH slot may be indicated via a start and length indicator value (SLIV). The MsgA PUSCH configuration may comprise multiple contiguous PUSCH slots, each slot containing the same number of POs. The start of the first PRB relative to the first PRB in a bandwidth part (BWP) may also be given by the MsgA PUSCH configuration. Moreover, the modulation and coding scheme (MCS) for MsgA PUSCH may also be given by the MsgA PUSCH configuration.

Each PRACH preamble may map to a PUSCH occasion and a Demodulation Reference signal (DMRS) port and/or a DMRS port-scrambling sequence combination according to a procedure given in 3GPP TS 38.213 v. 17.1.0. This mapping may allow a gNB to uniquely determine the location of the associated PUSCH in time and frequency as well as the DMRS port and/or scrambling from the preamble selected by the UE.

Small Data Transmission (SDT) Procedures

NR may support RRC_INACTIVE state and UEs with infrequent, periodic and/or aperiodic, data transmission, interchangeably referred to as small data transmission, or SDT, may be generally maintained by the network not in RRC_IDLE but in the RRC_INACTIVE state. Until Rel-16, the RRC_INACTIVE state does not support data transmission. Hence, the UE may have to resume the connection, that is, move to RRC_CONNECTED state, for any DL data reception and UL data transmission. Connection setup and subsequently release to RRC_INACTIVE state may happen for each data transmission. This may result in unnecessary power consumption and signaling overhead. For this reason, support for UE transmission in RRC_INACTIVE state using random access procedure is introduced in Rel-17. Small data transmission (SDT) may be understood as a procedure to transmit UL data from a UE in RRC_INACTIVE state.

In FIG. 3, an example procedure is described.

SDT may be performed with either random access or configured grant (CG). The case in which the UE may transmit UL data with random access may use both 4-step RA type and 2-step RA type, as described above. If the UE uses the 4-step RA type for the SDT procedure, then the UE may transmit the UL data in the Msg3. If the UE uses the 2-step RA type for the SDT procedure, then the UE may transmit UL data in the MsgA.

Two types of Configured Grant (CG) UL transmission schemes have been supported in New Radio (NR) since Rel-15, referred as CG Type1 and CG Type2 in the standard. The major difference between these two types of CG transmission is that for CG Type1, an uplink grant may be provided by RRC configuration and activated automatically, while in the case of CG Type2, the uplink grant may be provided and activated via L1 signaling, that is, by an UL DCI with Cyclic Redundancy Check (CRC) scrambled by Configured Scheduling-Radio Network Temporary Identifier (CS-RNTI). In both cases, the spatial relation used for PUSCH transmission with Configured Grant may be indicated by the uplink grant, either provided by the RRC configuration or by an UL DCI.

The CG periodicity may be RRC configured, and this may be specified in the ConfiguredGrantConfig Information Element (IE). Different periodicity values may be supported in NR depending on the subcarrier spacing.

For use in SDT, the gNB may configure the UE with Configured Grant type 1 and may also configure Reference Signal Received Power (RSRP) threshold(s) for selection of UL carrier. The configuration may be given in the RRCRelease message sent to the UE while in connected state, to move the UE into Inactive state, or alternatively, in another dedicated RRC message, for example while the UE may be in RRC_CONNECTED. Alternatively, the configuration may be given in RRCRelease message after a small data transmission procedure where the UE may have started the procedure in RRC_INACTIVE and where the UE may stay in RRC_INACTIVE after procedure completion. The use of Configured Grant type of resource may require the UE to remain in synchronous state in that the time alignment may be maintained. Should the UE be out of time alignment, a RA type of procedure may be initiated instead, see above.

FIG. 3 is a schematic diagram illustrating a summary of a basic SDT procedure when the network may decide to resume the UE after SDT session.

0. The UE in RRC_INACTIVE may have a stored UE Access Stratum (AS) Inactive Context, including Inactive RNTI (I-RNTI), received in the last RRCRelease message including the suspendConfig, and the latest security keys (e.g., $K_{RRCInt}$, $K_{RRCenc}$, $K_{UPInt}$, $K_{UPenc}$) and while camping on a cell of a Target gNB, may determine to perform SDT, that is, to start an SDT session.

1. The UE may Reestablish and resume Signalling Radio Bearer 1 (SRB1) and other Radio Bearers (RBs) configured for SDT and may derive a new $K_{gNB}$ for the target gNB based on the stored $K_{gNB}$ and the Next Hop Chaining Count (NCC) value stored, which may have also been received in the last RRCRelease message including suspendConfig.
   a. This may be understood to mean that the UE may derive the $K_{gNB}$ key for the target cell based on the current $K_{gNB}$ key or the NH, using the stored NCC value;
   b. The UE may then compute the $K_{RRCenc}$ key, the $K_{RRCint}$ key, the $K_{UPint}$ key and the $K_{UPenc}$ key;
   c. May configure the Packet Data Convergence Protocol (PDCP) layer for the SDT-RBs to apply the new keys derived above;

2. The UE may transmit a Radio Resource Control (RRC) Resume Request message including I-RNTI, resume Medium Access Control (MAC)-I, Resume Cause+data over the SDT RBs.

3. As in legacy resume procedure, the network may perform context fetching with the last serving gNB, identified by the I-RNTI in Resume Request. The last serving gNodeB, which may be called an Anchor gNB may have the UE AS Inactive Context stored and based on the Resume MAC-I may be able to identify that this may be a legitimate UE, so the Anchor gNodeB may provide the context to the Target gNodeB. This step may be performed when the receiving gNB may not have the UE AS context.

4. Upon receiving the UE AS Inactive Context, the Target gNodeB may establish the UE context and process the received SDT, and forward to the Core Network (CN).

5. Subsequent UL/DL data over SDT RBs may be exchanged.

6. The UE may send a non-SDT data indication.

7. The UE may receive an RRCRelease including a suspendConfig, new NCC parameters, for key derivation in the next resume request, and a new I-RNTI, so the SDT session may end.

In step 6, if applicable, the UE may trigger a transmission of a Dedicated Control Channel (DCCH) message to the network on SRB1 wherein an RRC message may indicate the availability of data in the buffer of SRB(s)/Data Radio Bearer(s) (DRB(s)) not configured for SDT. The RRC message may be transmitted as SDT data in the SDT procedure. Based on the RRC message, the Network (NW) may, in step 7, bring the UE into CONNECTED mode with RRCResume response, or alternatively to IDLE mode using a RRCRelease including a suspendConfig.

Sidelink Transmissions in NR

Sidelink transmissions over NR are specified for Rel. 16. These may be understood to be enhancements of the PROximity-based SErvices (ProSe) specified for LTE. Four new enhancements are particularly introduced to NR sidelink transmissions as follows.

A first enhancement may be understood to be that support for unicast and groupcast transmissions may be added in NR sidelink. For unicast and groupcast, the physical sidelink feedback channel (PSFCH) may be introduced for a receiver UE to reply the decoding status to a transmitter UE.

A second enhancement may be understood to be that grant-free transmissions, which may be adopted in NR uplink transmissions, may be also provided in NR sidelink transmissions, to improve the latency performance.

A third enhancement may be understood to be that, to alleviate resource collisions among different sidelink transmissions launched by different UEs, it may enhance channel sensing and resource selection procedures, which may also lead to a new design of the Physical Sidelink Common Control Channel (PSCCH).

A fourth enhancement may be understood to be that, to achieve a high connection density, congestion control and thus the Quality of Service (QOS) management may be supported in NR sidelink transmissions.

To enable the above enhancements, new physical channels and reference signals may be introduced in NR, which may be available in LTE before, as follows.

One channel may be the Physical Sidelink Shared Channel (PSSCH), the SL version of PDSCH. The PSSCH may be transmitted by a sidelink transmitter UE, which may convey sidelink transmission data, system information blocks (SIBs) for radio resource control (RRC) configuration, and a part of the sidelink control information (SCI).

Another channel may be the Physical Sidelink (PSFCH), the SL version of PUCCH. The PSFCH may be transmitted by a sidelink receiver UE for unicast and groupcast, which may convey 1 bit information over 1 Radio Bearer (RB) for the HARQ acknowledgement (ACK) and the negative ACK (NACK). In addition, channel state information (CSI) may be carried in the medium access control (MAC) control element (CE) over the PSSCH instead of the PSFCH.

Yet another channel may be the Physical Sidelink Common Control Channel (PSCCH), the SL version of PDCCH. When the traffic to be sent to a receiver UE may arrive at a transmitter UE, a transmitter UE may need to first send the PSCCH, which may convey a part of SCI, the SL version of DCI, to be decoded by any UE for the channel sensing purpose, including the reserved time-frequency resources for transmissions, demodulation reference signal (DMRS) pattern and antenna port, etc.

One reference signal may be the Sidelink Primary/Secondary Synchronization Signal (S-PSS/S-SSS). Similar to downlink transmissions in NR, in sidelink transmissions, primary and secondary synchronization signals, called S-PSS and S-SSS, respectively, may be supported. Through detecting the S-PSS and S-SSS, a UE may be able to identify the sidelink synchronization identity (SSID) from the UE sending the S-PSS/S-SSS. Through detecting the S-PSS/S-SSS, a UE may therefore be able to know the characteristics of the UE transmitting the S-PSS/S-SSS. A series of process of acquiring timing and frequency synchronization together with SSIDs of UEs may be called initial cell search. It may be noted that the UE sending the S-PSS/S-SSS may not be necessarily involved in sidelink transmissions, and a node, e.g., UE/eNB/gNB, sending the S-PSS/S-SSS may be called a synchronization source. There may be 2 S-PSS sequences and 336 S-SSS sequences forming a total of 672 SSIDs in a cell.

Yet another channel may be the Physical Sidelink Broadcast Channel (PSBCH). The PSBCH may be transmitted along with the S-PSS/S-SSS as a synchronization signal/PSBCH block (SSB). The SSB may have the same numerology as PSCCH/PSSCH on that carrier, and an SSB may need to be transmitted within the bandwidth of the configured BWP. The PSBCH may convey information related to synchronization, such as the direct frame number (DFN), indication of the slot and symbol level time resources for sidelink transmissions, in-coverage indicator, etc. The SSB may be transmitted periodically at every 160 ms.

Other reference signals may be the DMRS, phase tracking reference signal (PT-RS), channel state information reference signal (CSI-RS). These physical reference signals supported by NR downlink/uplink transmissions may also be adopted by sidelink transmissions. Similarly, the PT-RS may only be applicable for FR2 transmission.

Another new feature may be the two-stage SCI. This may be understood to be a version of the DCI for SL. Unlike the DCI, only part, first stage, of the SCI may be sent on the PSCCH. This part may be used for channel sensing purposes, including the reserved time-frequency resources for transmissions, DMRS pattern and antenna port, etc. and may be read by all UEs while the remaining, second stage, scheduling and control information such as a 8-bits source identity (ID) and a 16-bits destination ID, New Data Indicator (NDI), Redundancy Version (RV) and HARQ process ID may be sent on the PSSCH to be decoded by the receiver UE.

Similar as for ProSe in LTE, NR sidelink transmissions may have the following two modes of resource allocations: Mode 1, wherein sidelink resources may be scheduled by a gNB, and Mode 2, wherein the UE may autonomously select sidelink resources from a configured, e.g., pre-configured, sidelink resource pool(s) based on the channel sensing mechanism.

For the in-coverage UE, a gNB may be configured to adopt Mode 1 or Mode 2. For the out-of-coverage UE, only Mode 2 may be adopted.

As in LTE, scheduling over the sidelink in NR may be done in different ways for Mode 1 and Mode 2.

Mode 1 may support the following two kinds of grants: dynamic grant and configured grant.

Dynamic grant: When the traffic to be sent over sidelink may arrive at a transmitter UE, this UE may need to launch the four-message exchange procedure to request sidelink resources from a gNB, Scheduling Request (SR) on UL, grant, Buffer Status Report (BSR) on UL, grant for data on SL sent to UE. During the resource request procedure, a gNB may allocate a sidelink radio network temporary identifier (SL-RNTI) to the transmitter UE. If this sidelink resource request is granted by a gNB, then gNB may indicate the resource allocation for the PSCCH and the PSSCH in the downlink control information (DCI) conveyed by PDCCH with CRC scrambled with the SL-RNTI. When a transmitter UE may receive such a DCI, a transmitter UE may obtain the grant only if the scrambled CRC of DCI may be successfully solved by the assigned SL-RNTI. A transmitter UE may then indicate the time-frequency resources and the transmission scheme of the allocated PSSCH in the PSCCH and launch the PSCCH and the PSSCH on the allocated resources for sidelink transmissions. When a grant is obtained from a gNB, a transmitter UE may only transmit a single Transmission Block (TB). As a result, this kind of grant may be suitable for traffic with a loose latency requirement.

Configured grant: For the traffic with a strict latency requirement, performing the four-message exchange procedure to request sidelink resources may induce unacceptable latency. In this case, prior to the traffic arrival, a transmitter UE may perform the four-message exchange procedure and request a set of resources. If a grant may be obtained from a gNB, then the requested resources may be reserved in a periodic manner. Upon traffic arriving at a transmitter UE, this UE may launch the PSCCH and the PSSCH on the upcoming resource occasion. In fact, this kind of grant may also be known as grant-free transmissions.

In both dynamic grant and configured grant, a sidelink receiver UE may not receive the DCI, since it may be understood to be addressed to the transmitter UE, and therefore a receiver UE may need to perform blind decoding to identify the presence of PSCCH and find the resources for the PSSCH through the SCI.

When a transmitter UE launches the PSCCH, CRC may also be inserted in the SCI without any scrambling.

In the Mode 2 resource allocation, when traffic arrives at a transmitter UE, this transmitter UE may need to autonomously select resources for the PSCCH and the PSSCH. To further minimize the latency of the feedback HARQ ACK/NACK transmissions and subsequently retransmissions, a transmitter UE may also reserve resources for PSCCH/PSSCH for retransmissions. To further enhance the probability of successful TB decoding at one shot and thus suppress the probability to perform retransmissions, a transmitter UE may repeat the TB transmission along with the initial TB transmission. This mechanism may also be known as blind retransmission. As a result, when traffic arrives at a transmitter UE, then this transmitter UE may need to select resources for the following transmissions:

1) The PSSCH associated with the PSCCH for initial transmission and blind retransmissions.
2) The PSSCH associated with the PSCCH for retransmissions.

Since each transmitter UE in sidelink transmissions may need to autonomously select resources for the above transmissions, how to prevent different transmitter UEs from selecting the same resources may turn out to be a critical issue in Mode 2. A particular resource selection procedure may therefore be imposed to Mode 2 based on channel sensing. The channel sensing algorithm may involve measuring RSRP on different subchannels and may require knowledge of the different UEs power levels of DMRS on the PSSCH or the DMRS on the PSCCH depending on the configuration. This information may be known only after receiver SCI launched by (all) other UEs. The sensing and selection algorithm may be rather complex.

Layer 2 (L2) UE-to-Network Relay

In the TR 23.752, v. 17.0.0 clause 6.7, the layer-2 based UE-to-Network relay is described.

General Information

In this clause, the protocol architecture supporting a L2 UE-to-Network Relay UE is provided.

The L2 UE-to-Network Relay UE may provide forwarding functionality that may relay any type of traffic over the PC5 link.

The L2 UE-to-Network Relay UE may provide the functionality to support connectivity to the 5GS for Remote UEs. A UE may be considered to be a Remote UE if it has successfully established a PC5 link to the L2 UE-to-Network Relay UE. A Remote UE may be located within NG-RAN coverage or outside of NG-RAN coverage.

FIG. 4 reproduces Figure A.2.1-1: User Plane Stack for L2 UE-to-Network Relay UE in TR 23.752, v. 17.0.0. FIG. 4 is a schematic diagram illustrating the protocol stack for the user plane transport. As depicted in the Figure, a remote UE 41 may have a PC5 link 42 to a Layer 2 UE-to-Network Relay UE 43, which may have a Uu interface 44 to an NG-RAN Node 45. The NG-RAN Node 45 may have an N3 interface 46 with a UPF 47, which may be the Protocol Data Unit (PDU) Session anchor, and which may have an N6 interface 48. On the remote UE 41 side, from top to bottom, the Application (APP) layer 49 is depicted, as well as the PDU layer 50, the NR-Service Data Adaptation Protocol (SDAP) 51, NR-PDCP 52, Radio Link Control (RLC) layer 53, MAC layer 54 and Physical (PHY) layer 55. Each of the RLC 53, MAC 54 and PHY 55 layers have a respective PC5 layer on the Remote UE 41 and the Relay UE 43. The relay function 56 of the Relay UE 43 may also have a corresponding respective NR layer for each of the RLC 53, MAC 54 and PHY 55 layers. The NG-RAN node 45 may also have a corresponding respective NR layer for each of the RLC 53, MAC 54 and PHY 55 layers, as well as an N3 Stack 57. The UPF 47 may also have a corresponding N3 stack 57, as well as a PDU layer.

FIG. 5 reproduces Figure A.2.2-1: Control Plane for L2 UE-to-Network Relay UE in TR 23.752, v. 17.0.0. FIG. 5 is a schematic diagram illustrating the protocol stack for the user plane transport, related to a PDU Session, including a Layer 2 UE-to-Network Relay UE 43. If the same entities are depicted in FIG. 5 as in FIG. 4, their description is not repeated. The PDU layer may correspond to the PDU carried between the Remote UE 41 and the Data Network (DN) over the PDU session. It may be important to note that the two endpoints of the PDCP link 58 may be the Remote UE 41 and the gNB 45. The relay function may be performed below PDCP 58. This may be understood to mean that data security may be ensured between the Remote UE 41 and the gNB 45 without exposing raw data at the UE-to-Network Relay UE 43.

As depicted in the Figure, the NG-RAN Node 45 may have an N2 interface 59 with an AMF 60, which may have an N11 interface 61 with a Session Management Function (SMF) 62. On the remote UE 41 side, from top to bottom, the NAS-Session Management (SM) layer 63 is depicted, as well as the NAS-Mobility Management (MM) layer 64, the NR-RRC layer 65, the NR-PDCP 58, the RLC layer 66, the MAC layer 67 and the Physical (PHY) layer 68. Each of the RLC 66, MAC 67 and PHY 68 layers have a respective PC5 layer on the Remote UE 41 and the Relay UE 43. The relay function 69 of the Relay UE 43 may also have a corresponding respective NR layer for each of the RLC 66, MAC 67 and PHY 68 layers. The NG-RAN node 45 may also have a corresponding respective NR layer for each of the RLC 66, MAC 67 and PHY 68 layers, as well as an N2 Stack 70. The AMF 60 may also have a corresponding N2 stack 70, as well as an N11 Stack 71 and a NAS-MM layer 64. The SMF 62 may also have an N11 stack 71 and a NAS-MM layer 64.

The adaptation relay layer 69 within the UE-to-Network Relay UE 43 may differentiate between signalling radio bearers (SRBs) and data radio bearers (DRBs) for a particular Remote UE 41. The adaption relay layer 69 may also be responsible for mapping PC5 traffic to one or more DRBs of the Uu 44. The definition of the adaptation relay layer 69 is under the responsibility of RAN WG2.

FIG. 6 reproduces Figure A.2.2-1 from TS 23.752, v. 17.0.0, Procedure for remote UE connection establishment, and illustrates the protocol stack of the Non-Access Stratum (NAS) connection for the Remote UE 41 to the NAS-MM and NAS-SM components. The NAS messages may be transparently transferred between the Remote UE 41 and 5G-AN over the Layer 2 UE-to-Network Relay UE 43 using: a) PDCP end-to-end connection, where the role of the UE-to-Network Relay UE 43 may be to relay the PDUs over the signalling radio bear without any modifications, b) N2 connection between the 5G-AN and AMF over N2, and c) N3 connection AMF and SMF over N11.

The role of the UE-to-Network Relay UE 43 may be to relay the PDUs from the signaling radio bearer without any modifications.

Relay Establishment Procedure

A remote UE 41 may need to establish its own PDU sessions/DRBs with the network before user plane data transmission.

PC5-RRC aspects of Rel-16 NR Vehicle-to-anything (V2X) PC5 unicast link establishment procedures may be reused to setup a secure unicast link between a remote UE 41 and a relay UE 43 for L2 UE-to-Network relaying before the remote UE 41 may establish a Uu RRC connection with the network via the relay UE 43.

For both in-coverage and out-of-coverage cases, when the remote UE 41 may initiate the first RRC message for its connection establishment with the gNB 72, the PC5 L2 configuration for the transmission between the remote UE 41 and the UE-to-Network relay UE 43 may be based on the RLC/MAC configuration defined in specifications.

The establishment of Uu SRB1/SRB2 and DRB of the remote UE may be subject to legacy Uu configuration procedures for L2 UE-to-network relay.

The high level connection establishment procedure depicted in FIG. 6 and described below may apply to L2 UE-to-Network relay:

Step 1. The remote 41 and relay UE 43 may perform discovery procedure and establish a PC5-RRC connection using the legacy Rel-16 procedure as a baseline.

Step 2. The remote UE 41 may send the first RRC message, e.g., RRCSetupRequest, for its connection establishment with the gNB 72 via the relay UE 43, using a default L2 configuration on PC5. The gNB 72 may respond with an RRCSetup message to the remote UE 41. The RRCSetup delivery to the remote UE 41 may use the default configuration on PC5. If the relay UE 43 had not started in RRC_CONNECTED, it may need to do its own connection establishment as part of this step. The details for relay UE 43 to forward the RRCSetupRequest/RRCSetup message for the remote UE 43 at this step may be discussed in the Work Item (WI) phase.

Step 3. The gNB 72 and the relay UE 43 may perform a relaying channel setup procedure over Uu. According to the configuration from the gNB 72, the relay/remote UE 41/43 may establish an RLC channel for relaying of SRB1 towards the remote UE 41 over PC5. This step may prepare the relaying channel for SRB1.

Step 4. The remote UE 43 SRB1 message, e.g., an RRCSetupComplete message, may be sent to the gNB 72 via the relay UE 43 using the SRB1 relaying channel over PC5. Then, the remote UE 43 may be RRC connected over Uu.

Step 5. The remote UE 43 and the gNB 72 may establish security following legacy procedure and the security messages may be forwarded through the relay UE 43.

Step 6. The gNB 72 may set up additional RLC channels between the gNB 72 and the relay UE 43 for traffic relaying. According to the configuration from the gNB 72, the relay/remote UE 41/43 may set up additional RLC channels between the remote UE 41 and the relay UE 43 for traffic relaying. The gNB 72 may send an RRCReconfiguration to the remote UE 41 via the relay UE 43, to set up the relaying SRB2/DRBs. The remote UE 41 may send an RRCReconfigurationComplete to the gNB 72 via the relay UE 43 as a response.

Existing methods for signalling by a remote UE may result in that the behavior of the UE may not be clear and this may lead to wrong UE and/or network actions with long connectivity interruption, increasing signaling overhead, and increasing power consumption at the UE and network side.

SUMMARY

As part of the development of embodiments herein, one or more challenges with the existing technology will first be identified and discussed.

For what concerns SDT, when a UE may be configured by the network to use small data transmission, the UE may use a special preamble to indicate to the network that a small data session is incoming and also to indicate that the (first) small data transmission may be multiplexed together with the RRCResumeRequest message that may be sent right after receiving the random access response (RAR) from the network. In case of 2 step RACH, the UE may multiplex the small data traffic directly in the user data part of msgA.

In case of a sidelink relay scenario, there may be understood to be a remote UE that may be connected to the network via an intermediate node, a UE, that may be called relay UE. The relay UE may be understood to be the node that may have the Uu link with the network, whereas the remote UE and relay UE may communicate with each other via the PC5, sidelink, interface. According to this, the remote UE may be understood to not be required to perform any random access procedure when establishing a sidelink relay link, since, ultimately, it may be understood to be the relay UE who may need to perform the access to the network. Thus, only the relay UE may perform random access in this case.

Given this, the main problem is that when a remote UE may be configured with SDT by the network and may try to use the SDT framework, the UE may be understood to need to trigger random access to use SDT but, at the same time, the random access procedure is not supported for the remote UE in case of sidelink relay. The result is that the UE may either not transmit the SDT traffic, if the UE follows the sidelink relay specification, or trigger random access towards the network, if the UE follows the sidelink framework, but this may be interpreted as a wrong behavior by the network and thus it may release the UE. In both cases the behavior of the UE may not be clear and this may lead to wrong UE and/or network actions with long connectivity interruption, increasing signaling overhead, and increasing power consumption at the UE and network side.

Certain aspects of the present disclosure and their embodiments may provide solutions to these or other challenges.

It is therefore an object of embodiments herein to improve the handling of transmission of data in a wireless communications network.

According to a first aspect of embodiments herein, the object is achieved by a method, performed by a first wireless device. The method is for handling transmission of data. The first wireless device operates in a wireless communications network. The first wireless device obtains a first indication indicating a trigger to transmit data to a network node, in inactive state. A size of a buffer comprising the data is smaller than a threshold. The first wireless device holds a first connection to the network node via a second wireless device. The wireless device then refrains from sending the data to the network node in inactive state via the second wireless device. The refraining is based on the first wireless device holding the first connection to the network node via the second wireless device.

According to a second aspect of embodiments herein, the object is achieved by a method, performed by the network node. The method is for handling the transmission of the data by the first wireless device. The network node operates in the wireless communications network. The network node prevents the first wireless device from sending the data to the network node, in inactive state, with the proviso the first wireless device holds the first connection with the network node. The first connection comprises a sidelink with the second wireless device. The size of the buffer comprising the data is smaller than the threshold.

According to a third aspect of embodiments herein, the object is achieved by the first wireless device. The first wireless device may be understood to be for handling the transmission of the data. The first wireless device is configured to operate in the wireless communications network. The first wireless device is further configured to obtain the first indication configured to indicate the trigger to transmit data to the network node, in inactive state. The size of the buffer configured to comprise the data is configured to be smaller than the threshold. The first wireless device is configured to hold the first connection to the network node via the second wireless device. The first wireless device is also configured to refrain from sending the data to the network node in inactive state via the second wireless device. The refraining is configured to be based on the first wireless device holding the first connection to the network node via the second wireless device.

According to a fourth aspect of embodiments herein, the object is achieved by the network node. The network node may be understood to be for handling the transmission of the data by the first wireless device. The network node is configured to operate in the wireless communications network. The network node is configured to prevent the first wireless device from sending the data to the network node, in inactive state, with the proviso the first wireless device holds the first connection with the network node. The first connection is configured to comprise the sidelink with the second wireless device. The size of the buffer configured to comprise the data is configured to be smaller than the threshold.

The methods and approaches disclosed herein may be understood to aim at clarifying what may be the network node and first wireless device actions when SDT may be configured by the network node for a remote UE such as the first wireless device involved in sidelink relay operations. According to some embodiments herein, the network node may never configure SDT for a UE such as the first wireless device that may be involved in sidelink relay operation and, even if this happens, a remote UE such as the first wireless device may never use the SDT framework to send traffic to the network node.

This may be understood to avoid long connectivity interruption for the first wireless device but also prevent the signaling overhead, power consumption, and latency to be increased at the first wireless device and network node side.

BRIEF DESCRIPTION OF THE DRAWINGS

Examples of embodiments herein are described in more detail with reference to the accompanying drawings, and according to the following description.

DETAILED DESCRIPTION

Figure 1:
FIG. 1 is a schematic representation depicting an example of a 4-step RACH procedure, according to existing methods.
Figure 1:
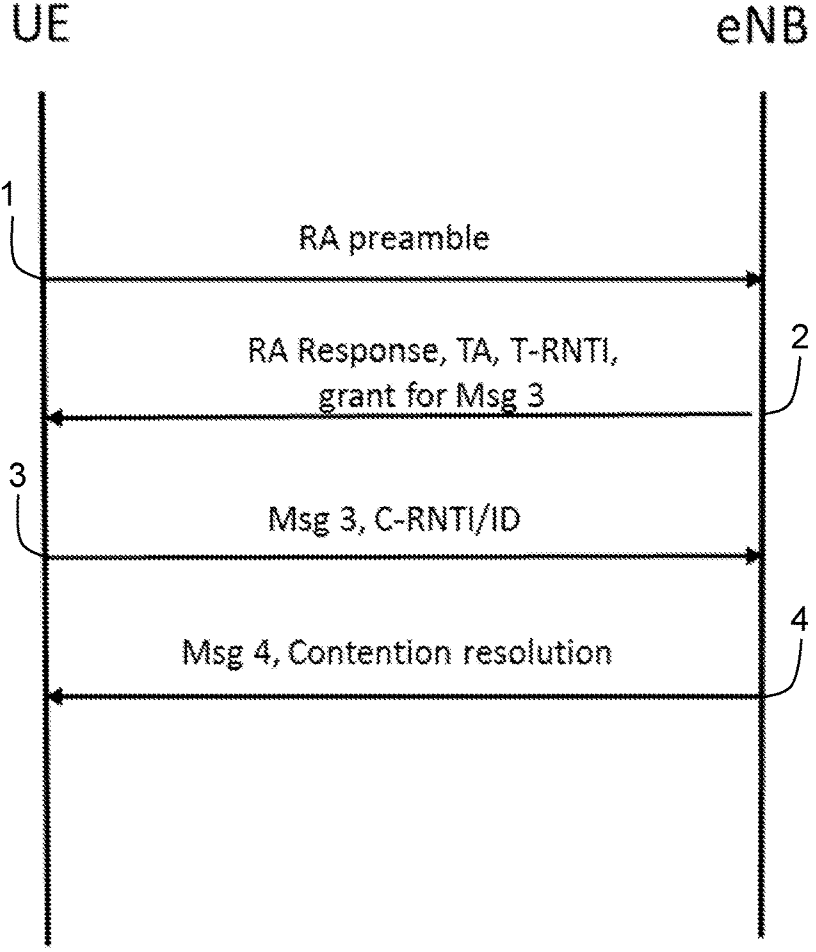
Figure 2:
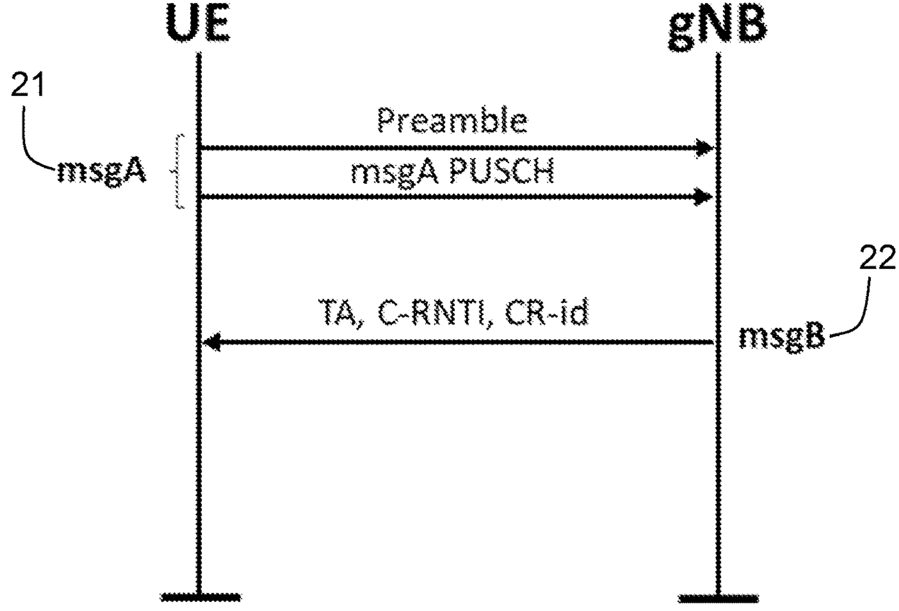
FIG. 2 is a schematic representation depicting an example of 2-step RA according to existing methods.
Figure 3:
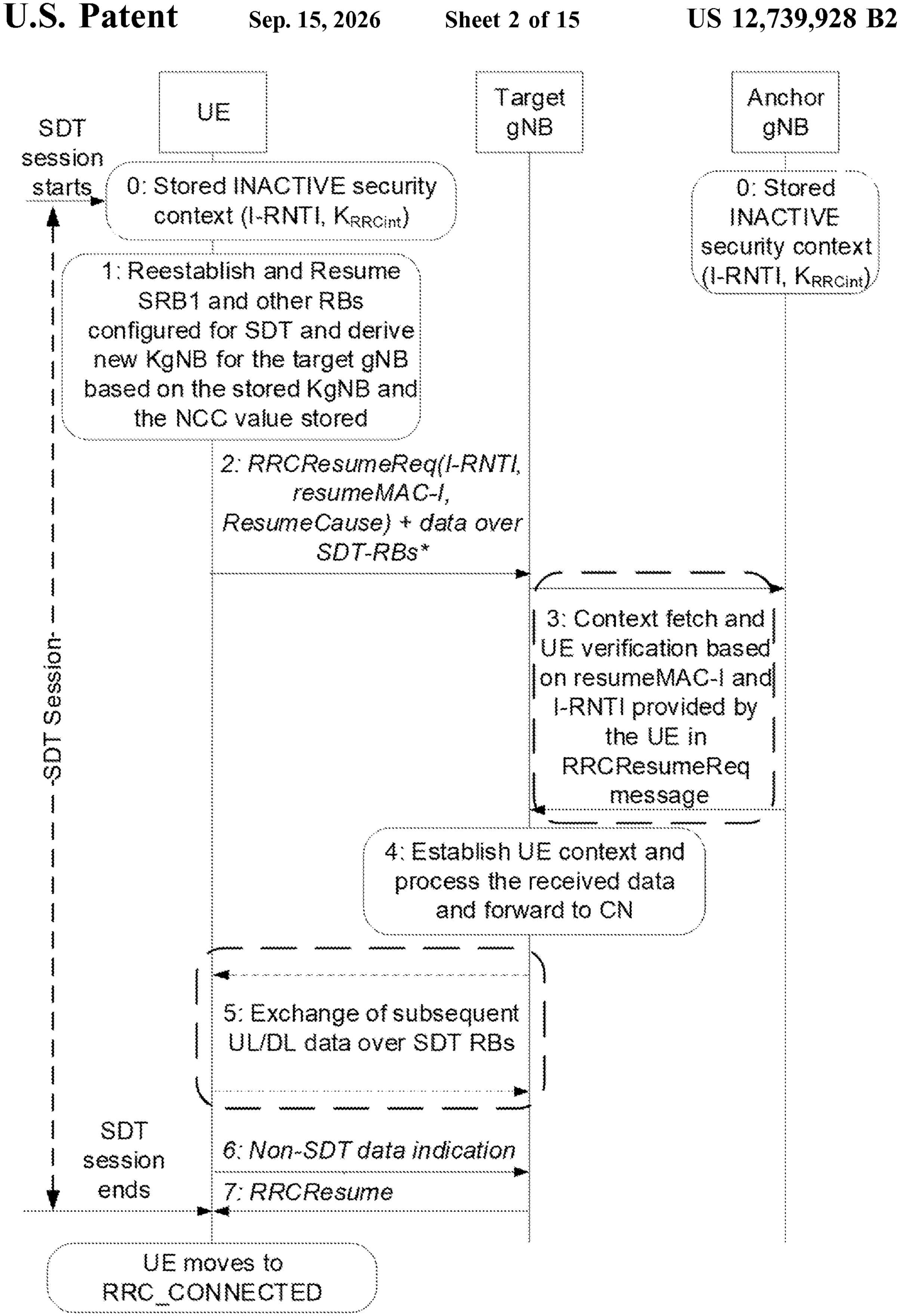
FIG. 3 is a schematic representation depicting an example of a basic SDT procedure, according to existing methods.
Figure 4:
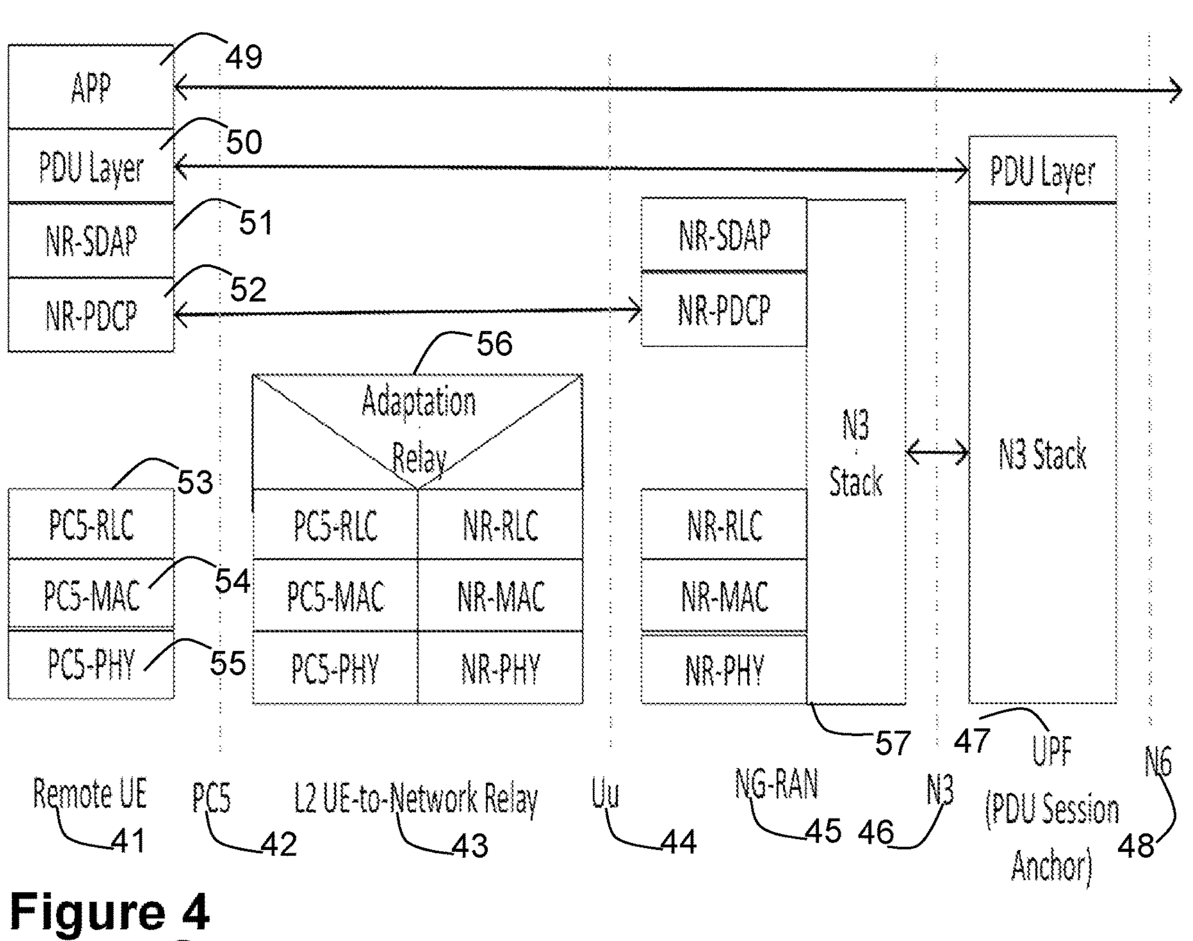
FIG. 4 is a schematic representation depicting an example of a User Plane Stack for L2 UE-to-Network Relay UE, according to existing methods.
Figure 5:
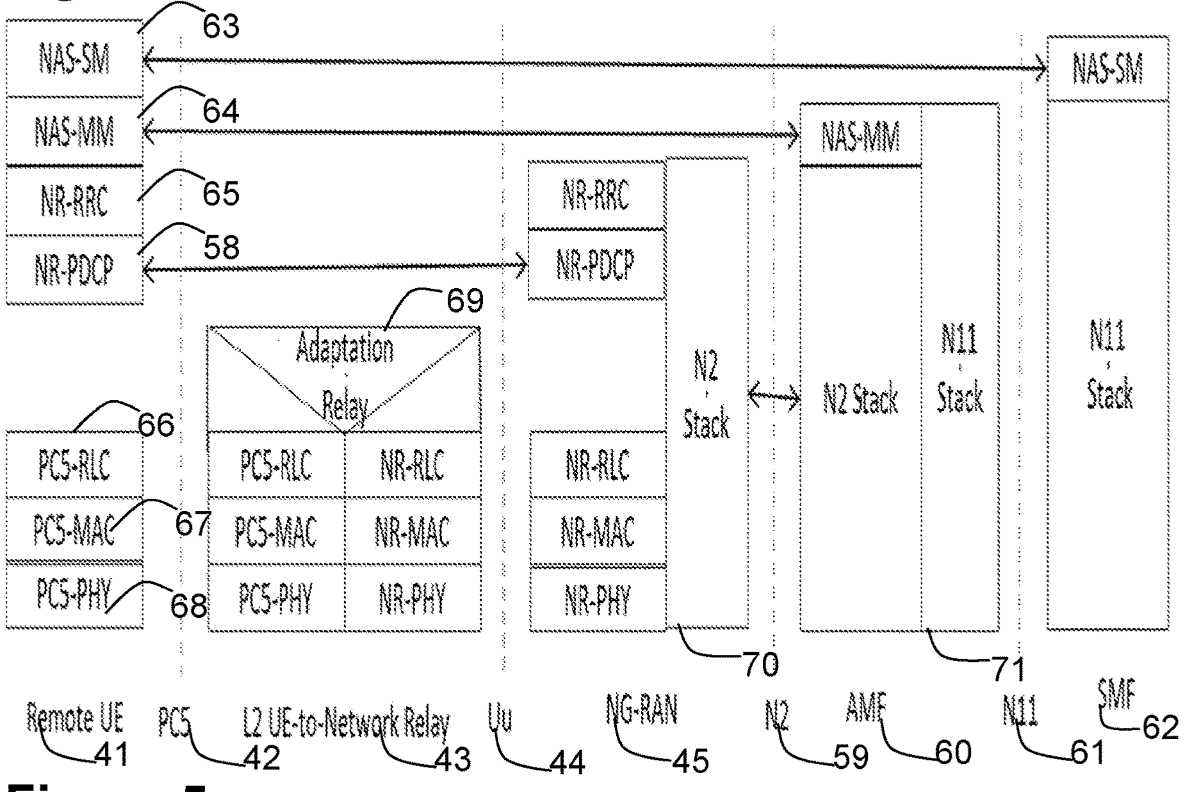
FIG. 5 is a schematic representation depicting an example of a Control Plane for L2 UE-to-Network Relay UE, according to existing methods.
Figure 6:
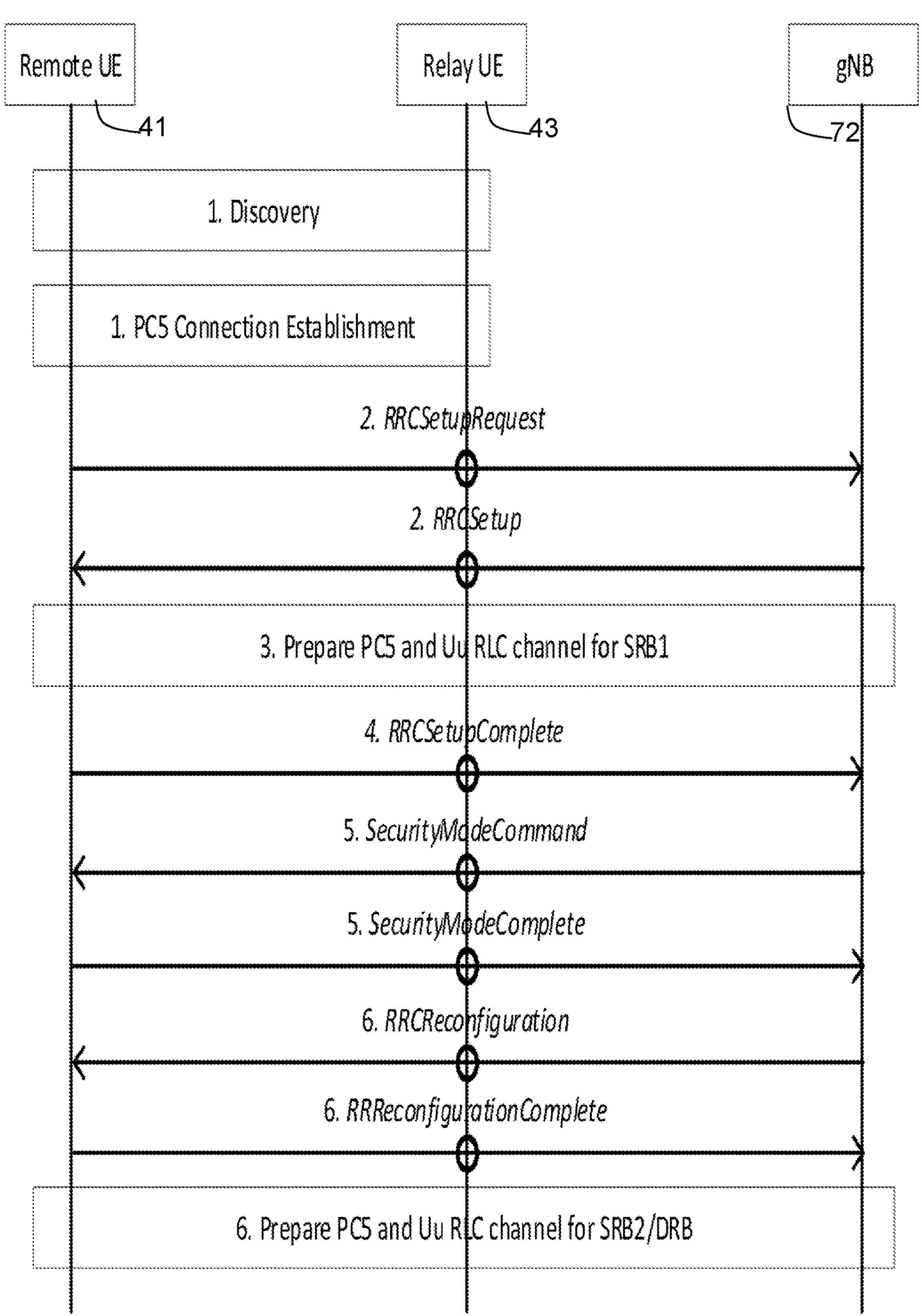
FIG. 6 is a schematic representation depicting an example of a procedure for remote UE connection establishment, according to existing methods.

Certain aspects of the present disclosure and their embodiments may provide solutions to the challenge described in the Summary Section or other challenges. There are, proposed herein, various embodiments which address one or more of the issues disclosed herein.

Embodiments herein may be understood to be related to disabling SDT in case of SL relay scenarios.

Embodiments herein may aim at clarifying what may be the network and UE actions when SDT may be configured by the network for a remote UE involved in sidelink relay operations. According to some embodiments herein, the network may never configure SDT for a UE that may be involved in sidelink relay operation and, even if this happens, a remote UE may be required to never use the SDT framework to send traffic to the network. In order to achieve this, at least one, or a combination, of the following approaches may be used:

According to a first approach, a remote UE that is connected to the network via a relay UE may not trigger the SDT, even if configured by the network to do so. This may be understood to mean that even it receives an SDT configuration from the network, a remote UE may discard it. The remote UE may also inform the network that the received SDT configuration has been discarded.

According to a second approach, a remote UE that is connected to the network via a relay UE, in case it may be configured by the network with an SDT configuration and in case the triggering conditions for using SDT may be fulfilled, if the UE decides to use SDT, it may trigger the random access procedure towards the cell in which the UE may be camping in, and eventually suspend or release the sidelink relay connection. The idea may be understood to be that the remote UE may not trigger random access via the relay UE, but instead trigger random access via the direct Uu link, if the Uu link may be good enough to do so. If the remote UE is out of coverage, that is, not camping in any cell, the remote UE may simply not use SDT.

According to a third approach, the network may not configure SDT for UEs that may be involved in sidelink relay operations. This may be achieved according to the following. The SDT may not be configured by the network for those UE from which a sidelink-related RRC message may have been received. An example of sidelink-related RRC message may be the SidelinkUEInformation message, the UEAssistanceInformation message, and any other RRC message sent by the UE to the network that may include sidelink parameters or information. The SDT may not be configured by the network if the remote UE is connected to the network via a relay UE and this relay UE is in RRC-_CONNECTED. The SDT may not configured by the network for all the UEs that may request a sidelink-related System Information Block (SIB) on-demand, e.g., SIB12. The SDT may not be configured by the network for all the UEs that may send an explicit indication that may be establishing, already have, or going to have a sidelink relay connection. In this case, the UE sending the indication may be the remote UE or the relay UE.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 7:
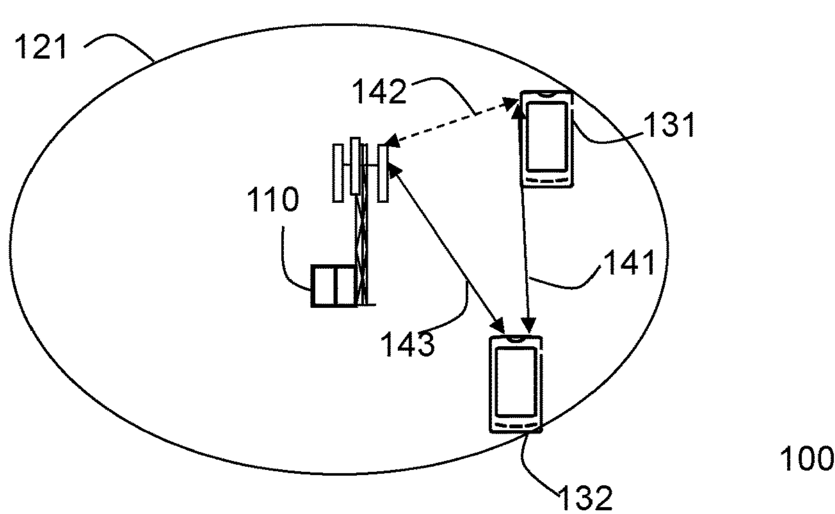
FIG. 7 is a schematic diagram illustrating a wireless communications network, according to embodiments herein.
Figure 7:
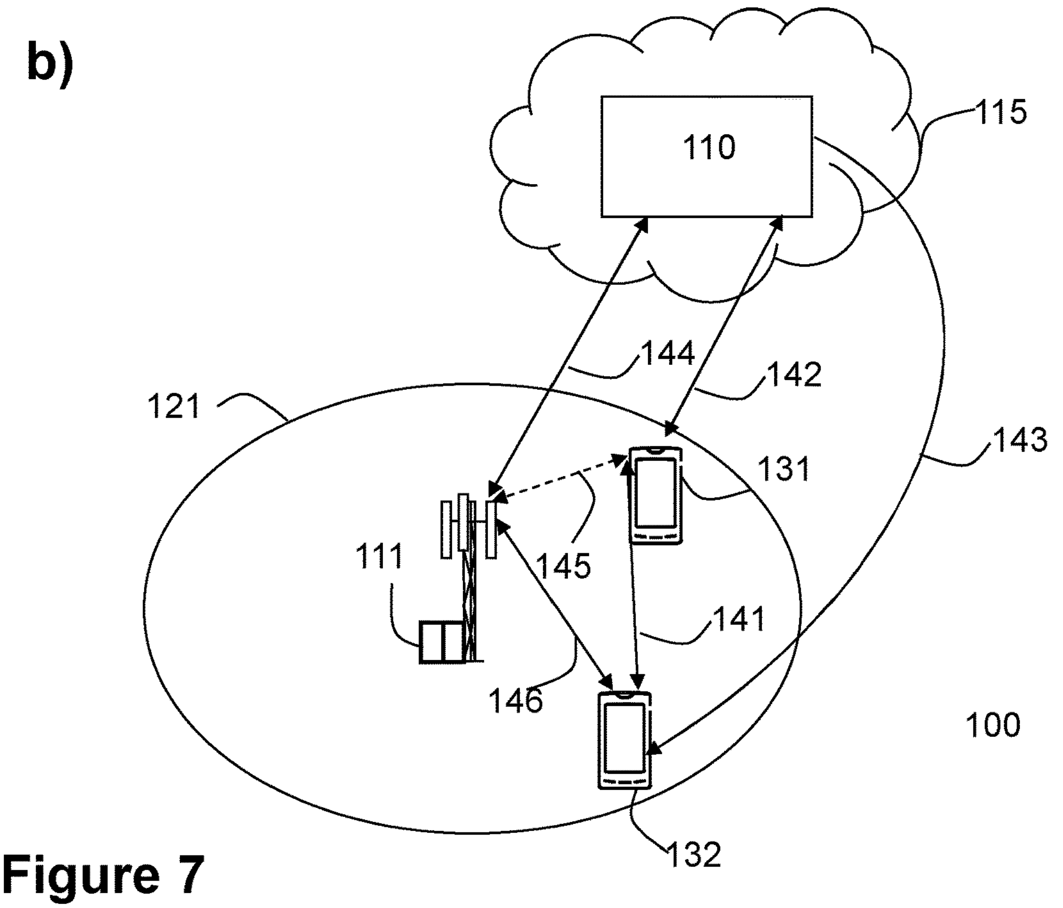

FIG. 7 depicts two non-limiting examples, in panel a) and panel b), respectively, of a wireless communications network 100, sometimes also referred to as a wireless communications system, cellular radio system, or cellular network, in which embodiments herein may be implemented. The wireless communications network 100 may typically be a 5G system, 5G network, NR-U or Next Gen System or network. The wireless communications network 100 may support a younger system than a 5G system. In some embodiments, the wireless communications network 100 may be, or may support Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, etc. . . . and/or any other Radio Access Technology (RAT) enabling direct communication between two or more nearby devices, e.g., Wifi, Zigbee, Bluetooth. The wireless communications network 100 may support yet other technologies such as, for example, License-Assisted Access (LAA), Narrow Band Internet of Things (NB-IoT), Machine Type Communication (MTC), MulteFire, Wideband Code Division Multiplexing Access (WCDMA), Universal Terrestrial Radio Access (UTRA) TDD, Global System for Mobile communications (GSM) network, Enhanced Data for GSM Evolution (EDGE) network, GSM/EDGE Radio Access Network (GERAN) network, Ultra-Mobile Broadband (UMB), network comprising of any combination of Radio Access Technologies (RATs) such as e.g., Multi-Standard Radio (MSR) base stations, multi-RAT base stations etc., any 3rd Generation Partnership Project (3GPP) cellular network, WiFi networks, Worldwide Interoperability for Microwave Access (WiMax). Thus, although terminology from 5G/NR and LTE may be used in this disclosure to exemplify embodiments herein, this should not be seen as limiting the scope of the embodiments herein to only the aforementioned systems.

The wireless communications network 100 comprises a network node 110, as depicted in the non-limiting examples FIG. 7. The network node 110 may be a radio network node, as depicted in the non-limiting the example of panel a), or a core network node, as depicted in the non-limiting example of panel b). In embodiments wherein the network node 110 may be a core network node, the wireless communications network 100 may further comprise a radio network node 111, as depicted in the non-limiting example of panel b). A radio network node may be understood as a transmission point such as a radio base station, for example a gNB, an eNB, or any other network node with similar features capable of serving a wireless device, such as a user equipment or a machine type communication device, in the wireless communications network 100. In other examples, which are not depicted in FIG. 7, the network node 110 may be a distributed node, such as a virtual node in the cloud 115, and may perform its functions entirely on the cloud 115, or partially, in collaboration with a radio network node. In the non-limiting example depicted in panel b) of FIG. 7, the network node 110 is a core network node in the cloud 115.

The wireless communications network 100 covers a geographical area which may be divided into cell areas, wherein each cell area may be served by a network node, although, one radio network node may serve one or several cells. The wireless communications network 100 may comprise a first cell 121. The first cell 121 may be served by the network node 110.

The network node 110 may be of different classes, such as, e.g., macro base station, home base station or pico base station, based on transmission power and thereby also cell size. The network node 110 may support one or several communication technologies, and its name may depend on the technology and terminology used. In 5G/NR, the network node 110 as a radio network node may be referred to as a gNB and may be directly connected to one or more core networks.

A wireless device 131, 132 may be comprised in the wireless communication network 100. The wireless device 131, 132 may be any of a first wireless device 131 and a second wireless device 132. In other words, any reference herein to the wireless device 131, 132, may be understood to refer to any of the first wireless device 131 and the second wireless device 132. Any reference herein to another wireless device 131, 132, may be understood to refer to the other of the first wireless device 131 and the second wireless device 132. For example, if "the wireless device 131, 132" is the first wireless device 131, the another wireless device 131, 132 may be understood to refer to the second wireless device 132. Similarly, if "the wireless device 131, 132" is the second wireless device 132, the another wireless device 131, 132 may be understood to refer to the first wireless device 131. The wireless device 131, 132, that is, any of the first wireless device 131 and the second wireless device 132, comprised in the wireless communications network 100 may be a wireless communication device such as a 5G UE, or a UE, which may also be known as e.g., mobile terminal, wireless terminal and/or mobile station, a mobile telephone, cellular telephone, or laptop with wireless capability, just to mention some further examples. The wireless device 131, 132, that is, any of the first wireless device 131 and the second wireless device 132, comprised in the wireless communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, a sensor, an Internet of Things (IoT) device, or any other radio network unit capable of communicating over a radio link in a communications system. The wireless device 131, 132, that is, any of the first wireless device 131 and the second wireless device 132, comprised in the wireless communications network 100 may be enabled to communicate wirelessly in the wireless communications network 100. The communication may be performed directly between the devices, and/or via a RAN, and possibly the one or more core networks, which may be comprised within the wireless communications network 100.

In some embodiments, the first wireless device 131 may communicate with the network node 110 via the second wireless device 132. The first wireless device 131 in some examples, may be a remote wireless device. In these examples, the second wireless device 132 may be a relay wireless device. Further, the remote wireless device or remote UE may be referred to as Remote (RM) UE, as that may be able to transmit/receive packet from/to a gNB such as the radio network node 111 via an intermediate mobile terminal such as the second wireless device 132, e.g., a UE to NW relay UE, that may be referred to as Relay (RL) UE.

The term "network" may be used to refer to the network nodes which may comprise a mobile network, such as gNB, AMF, UPF, the network node 110, etc, as opposed to the user equipment (UE). Expressions such as "network configures" or "informing the network", may be used to refer to transactions or physical transmissions over the Uu air interface between the UE, such as any of the first wireless device 131 and the second wireless device 132, and the network node 110, e.g., gNB, where the network node 110, e.g., gNB, may have further transactions to and from other nodes comprising the network and particular procedures may be triggered in the network node 110, e.g., gNB, or any other network node. The used communication protocol the be terminated at UE, such as any of the first wireless device 131 and the second wireless device 132, and the network node 110, or in some other network node, or between the gNB and another network node.

The first wireless device 131 may be configured to communicate within the wireless communications network 100 with the second wireless device 131 over a first link 141, e.g., a radio link. The first wireless device 131 and the network node 110 may be configured to communicate within the wireless communications network 100 over a second link 142, e.g., a radio link. The second wireless device 132 may be configured to communicate within the wireless communications network 100 with the network node 110 over a third link 143, e.g., a radio link. The radio network node 111 may be configured to communicate within the wireless communications network 100 with the network node 110 over a fourth link 144, e.g., a radio link or a wired link. The radio network node 111 may be configured to communicate within the wireless communications network 100 with the first wireless device 131 over a fifth link 145, e.g., a radio link. The radio network node 111 may be configured to communicate within the wireless communications network 100 with the second wireless device 132 over a sixth link 146, e.g., a radio link.

The link or radio link over which the signals may be transmitted between at least two UEs for Device to Device (D2D) operation, such as between the first wireless device 131 and the second wireless device 132, may be referred to herein as the sidelink (SL). The signals transmitted between the UEs, e.g., the first wireless device 131 and the second wireless device 132, for D2D operation may be referred to herein as SL signals. The term SL may also be interchangeably referred to as D2D link, V2X link, prose link, peer-to-peer link, PC5 link etc. The SL signals may also be interchangeably referred to as V2X signals, D2D signals, prose signals, PC5 signals, peer-to-peer signals etc.

Further, the term "direct path" may be used in order to describe a direct connection between a UE, such as any of the first wireless device 131 and the second wireless device 132, and the network, e.g., the network node 110, that may be operated over the Uu interface. Also, the term "indirect path" or "sidelink relay" may be used in order to describe a connection between a UE, such as any of the first wireless device 131, and the network, e.g., the network node 110, via, or with the help of, a middle node that in embodiments herein may be referred to as "relay UE", e.g., the second wireless device 132. The UE, that is, the first wireless device 131, may be also called "remote UE" in these two terms may be used without any loss of meaning.

In general, the usage of "first", "second", "third", "fourth", "fifth" and/or "sixth" herein may be understood to be an arbitrary way to denote different elements or entities, and may be understood to not confer a cumulative or chronological character to the nouns they modify.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a wireless device, such as the first wireless device 131, e.g., a UE, and embodiments related to a network node such as the network node 110, e.g., a gNB.

The methods and approaches disclosed in the following, may be referring to the NR RAT but may be also applied to LTE RAT and any other RAT enabling direct communication between two or more nearby devices, e.g., Wifi, Zigbee, Bluetooth etc, without any loss of meaning.

Figure 8:
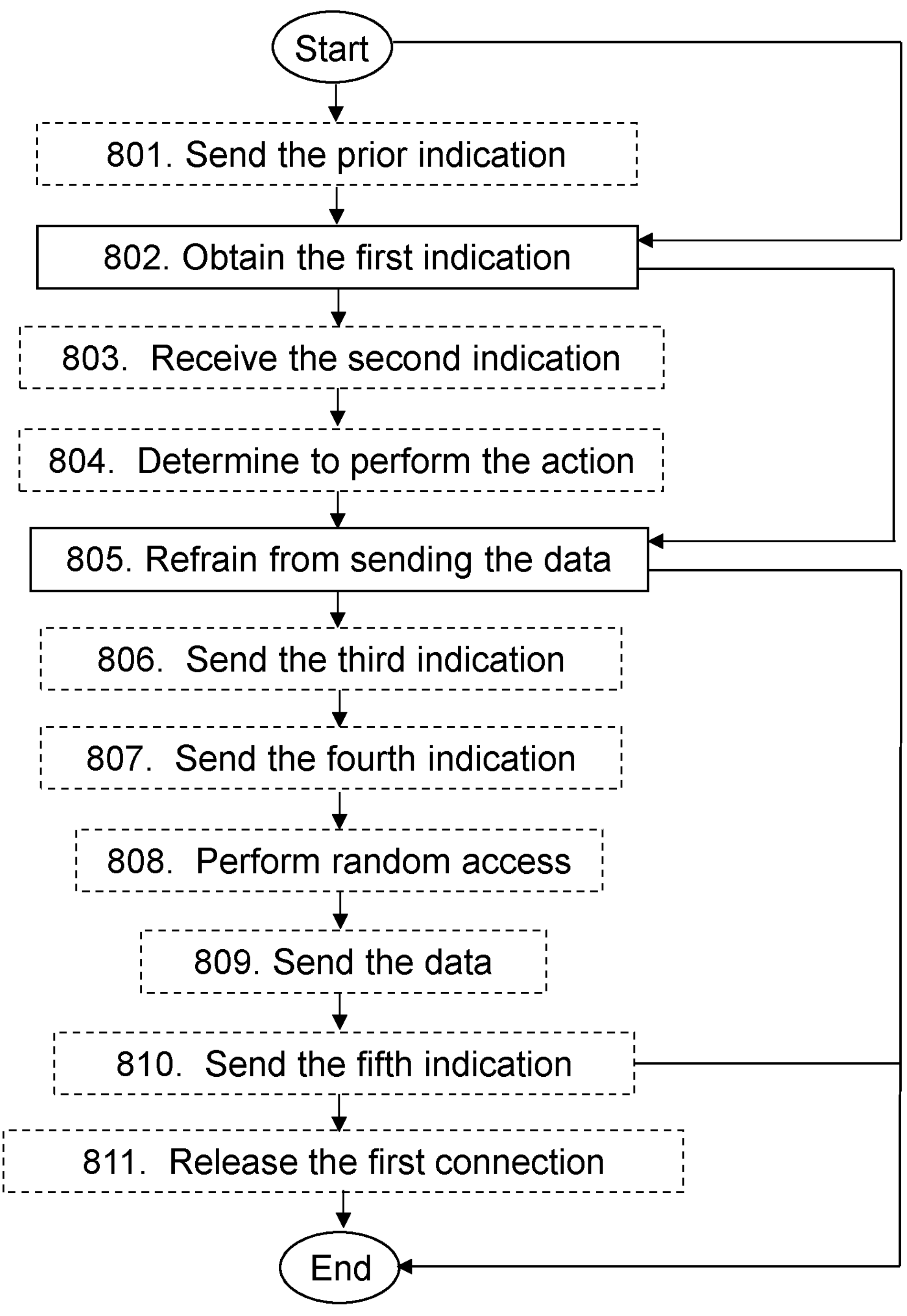
FIG. 8 is a flowchart depicting an example of a method performed by a first wireless device, according to embodiments herein.

Embodiments of a method, performed by a wireless device, such as the first wireless device 131, will now be described with reference to the flowchart depicted in FIG. 8. The method may be understood to be for handling transmission of data. The first wireless device 131 operates in a wireless communications network, such as the wireless communications network 100.

In some examples, the wireless communications network 100 may be a 5G network.

Several embodiments are comprised herein. In some embodiments all the actions may be performed. In some embodiments, some of the actions may be performed. In particular non-limiting examples, Action 802 and Action 805 may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the first wireless device 131 is depicted in FIG. 8. In FIG. 8, optional actions are represented with dashed lines. Some actions may be performed in a different order than that shown in FIG. 8.

Some embodiments herein will now be further described with some non-limiting examples.

In the following description, any reference to a/the "NW", network, gNB, network node may be understood to equally refer to any of the network node 110; any reference to the "UEs" may be understood to equally refer to the first wireless device 131 and the second wireless device 132; any reference to a/the "RM UE", remote UE may be understood to equally refer to the first wireless device 131; and any reference to a/the "RL UE", relay UE, UE to NW relay UE may be understood to equally refer to the second wireless device 132.

Action 801

In this Action 801, the first wireless device 131 may send a prior indication.

The sending of the prior indication may be to the network node 110, e.g., via the second link 142, and/or via the first link 141 and the third link 143.

The prior indication may indicate that the first wireless device 131 holds a first connection with the network node 110. The first wireless device 131 may hold the first connection to the network node 110 via the second wireless device 132. That is, e.g., the first wireless device 131 may be a remote wireless device, and the second wireless device 132 may be a relay wireless device.

The prior connection may be e.g., a sidelink-related RRC message or a message including sidelink fields, parameters, or information, a SidelinkUEInformation message, the UEAssistanceInformation message, and any other RRC message sent by the first wireless device 131 to the network node 110 that may include sidelink field, parameters, or information, the second wireless device 132 may report to the network node 110 when the first wireless device 131 may change its RRC state autonomously e.g., due to a Radio Link Failure (RLF) but may still have a PC5 connection so that first wireless device 131 and the second wireless device 132 may still communicate with each other, a request of a sidelink-related SIB/SI on-demand e.g., SIB12.

Action 802

In this Action 802, the first wireless device 131 obtains an indication, e.g., a first indication.

The first indication may indicate a trigger to transmit data to the network node 110 in inactive state.

A size of a buffer comprising the data may be smaller than a threshold. That is, the data may be "small data".

As stated earlier, the first wireless device 131 holds the first connection to the network node 110 via the second wireless device 132.

In some embodiments, the first indication may be a configuration received from the network node 110.

The configuration may configure the first wireless device 131 to transmit data to the network node 110 in inactive state.

The size of the buffer comprising the data may be smaller than the threshold.

The obtaining in this Action 802 may comprise retrieving e.g., from an internal memory, or another memory storage, or receiving from e.g., the network node 110, for example, via the third link 143.

In particular examples of the embodiments herein, the network node 110 may be a radio network node.

Action 803

In this Action 803, the first wireless device 131 may optionally receive a second indication.

The receiving of the second indication may be from the network node 110, e.g., via the second link 142, and/or via the first link 141 and the third link 143.

The second indication may indicate that the first indication, previously configured at the wireless device 131, 132, e.g., at the first wireless device 131, is not to be used. The second indication may be one of explicit and implicit.

This Action 803 may be performed in some of the embodiments wherein the first indication may be the configuration received from the network node 110, wherein the configuration may configure the first wireless device 131 to transmit data to the network node 110 in inactive state, and wherein the size of the buffer comprising the data may be smaller than the threshold.

Action 804

In this Action 804, the first wireless device 131 may determine to perform one of: i) discard the received first indication, and ii) store the received first indication.

The determining in this Action 804 may be optionally based on the received second indication.

Determining may be understood as calculating, deriving or similar.

This Action 804 may be performed in some of the embodiments wherein the first indication may be the configuration received from the network node 110, wherein the configuration may configure the first wireless device 131 to transmit data to the network node 110 in inactive state, and wherein the size of the buffer comprising the data may be smaller than the threshold.

Action 805

In this Action 805, the first wireless device 131 refrains from sending the data.

The first wireless device 131 may refrain from sending the data to the network node 110 in inactive state via the second wireless device 132. The refraining may be based on the first wireless device 131 holding the first connection to the network node 110 via the second wireless device 132.

In some embodiments, one of the following options may apply. According to a first option, the first wireless device 131 may further refrain from sending the data to the network node 110 directly, in inactive state. In one example, the first wireless device 131, e.g., a remote UE that may be connected to the network via the second wireless device 132, e.g, a relay UE, may not trigger the SDT, even if configured by the network node 110 to do so. This may be understood to mean that even if the first wireless device 131 may receive, or may have received, an SDT configuration from the network node 110, a remote UE such as the first wireless device 131 may discard it.

According to a second option, the first wireless device 131 may send the data to the network node 110 with the proviso that the first wireless device 131 holds a second connection to the network node 110; the second connection may be a direct connection.

In some embodiments, one of the following may apply. According to a first option, the refraining 805 may be based on the first indication having been deconfigured from the first wireless device 131 by the network node 110, e.g., by receiving a deconfiguration instruction from the network node 110. According to a second option, the refraining in Action 805 may be further based on the first wireless device 131 being out of coverage of any cell. In another example, the first wireless device 131, e.g., a remote UE that may be connected to the network node 110 via the second wireless device 132, e.g., a relay UE, in case is configured by the network node 110 with an SDT configuration and in case the triggering conditions for using SDT may be fulfilled, if the remote UE, e.g., the first wireless device 131, is out of coverage, that is, not camping in any cell, but still configured by the network node 110 to use SDT, e.g., because it received the configuration via the relay UE, e.g., the second wireless device 132, the remote UE, e.g., the first wireless device 131 may simply not use SDT, that is, may not initiate the SDT procedure even if the SDT, any of the, triggering conditions may be fulfilled.

According to a third option, the first wireless device 131 may hold the second connection to the network node 110.

Action 806

In this Action 806, the first wireless device 131 may optionally send a third indication.

The sending of the third indication may be to the network node 110, e.g., via the second link 142, and/or via the first link 141 and the third link 143.

The third indication may indicate an acknowledgement of receipt of the second indication.

This Action 806 may be performed in some of the embodiments wherein the first indication may be the configuration received from the network node 110, wherein the configuration may configure the first wireless device 131 to transmit data to the network node 110 in inactive state, and wherein the size of the buffer comprising the data may be is smaller than the threshold.

Action 807

In this Action 807, the first wireless device 131 may send a fourth indication.

The sending of the fourth indication may be to the network node 110, e.g., via the second link 142, and/or via the first link 141 and the third link 143.

The fourth indication may indicate, based on a result of the determination, that the first wireless device 130 has one of: discarded and stored the first indication.

This Action 807 may be performed in some of the embodiments wherein the first indication may be the configuration received from the network node 110, wherein the configuration may configure the first wireless device 131 to transmit data to the network node 110 in inactive state, and wherein the size of the buffer comprising the data may be smaller than the threshold.

In one example, the first wireless device 131, e.g., a remote UE, may also send the fourth indication to the network node 110 to inform that the received SDT configuration has been discarded. Alternatively, the first wireless device 131 may also keep the SDT configuration received, store it in its memory but without using it, meaning the SDT framework may not be used by the first wireless device 131, and the first wireless device 131 may not initiate SDT even if any triggering conditions for SDT may be fulfilled. In case the first wireless device 131 stores in its memory the SDT configuration but without using it, meaning the SDT framework may not be used by the first wireless device 131, the first wireless device 131 may also send the fourth indication to the network node 110 to inform that the configuration is stored but that SDT may not be used since the first wireless device 131, that is, the remote UE, is involved in a sidelink relay connection.

Above it has been described how a UE such as the first wireless device 131 may be handling an SDT configuration if the first wireless device 131 is connected via a relay compared to if a UE is not connected via a relay. In the above example, a UE such as the first wireless device 131 which may be connected to both the relay and the network node 110 directly, e.g., over a Uu-link, may consider itself not connected to a relay and hence not, e.g., discard SDT configurations. However, the opposite approach may also be possible, that is, that a UE such as the first wireless device 131 connected to both the relay and the network node 110 directly may, in the examples above, behave as if the first wireless device 131 is connected to a relay and hence, e.g., discard SDT configurations.

In some embodiments, such as examples of these later embodiments, the method may further comprise one or more of the following two actions:

Action 808

In some embodiments, one or more criteria for transmission of the data may be fulfilled.

In some of such embodiments, in this Action 808, the first wireless device 131 may perform random access.

The random access may be towards the network node 110, via one of: a) the second connection to the network node 110, the second connection being a direct connection, e.g., via the second link 142, and b) via the first connection with the second wireless device 132, e.g., via the first link 141 and the third link 143.

Action 809

In some of the embodiments wherein the one or more criteria for transmission of the data may be fulfilled, in this Action 809, the first wireless device 131 may send the data.

The sending of the data may be to the network node 110, e.g., via the second link 142, and/or via the first link 141 and the third link 143. The sending of the data in this Action 809 may be in connected mode, as a result of having performed the random access.

In some embodiments, the first wireless device 131 may perform the random access via the direct second connection.

In some embodiments, such as examples of these later embodiments, the method may further comprise one or more of the following two actions:

Action 810

In another example, the first wireless device 131, e.g., a remote UE that may be connected to the network node 110 via the second wireless device 132, e.g., a relay UE, in case is configured by the network node 110 with an SDT configuration and in case the triggering conditions for using SDT may be fulfilled, the first wireless device 131 may decide to use SDT and thus trigger the random access procedure towards the cell in which the first wireless device 131 may be camping in, and eventually suspend or release the sidelink relay connection.

In some of the embodiments wherein the first wireless device 131 may perform the random access via the direct second connection, in this Action 810, the first wireless device 131 may send a fifth indication.

The sending of the fifth indication may be to one of the network node 110, e.g., via the second link 142, and/or via the first link 141 and the third link 143, and the second wireless device 132, e.g., via the first link 141.

The fifth indication may indicate that the first connection is to be released.

Action 811

In some of the embodiments wherein the first wireless device 131 may perform the random access via the direct second connection, in this Action 811, the first wireless device 131 may release the first connection.

The releasing of the first connection may be based on the sent fifth indication, e.g., performed after, sending the fifth indication.

In another example, the first wireless device 131, e.g., a remote UE that may be connected to the network node 110 via the second wireless device 132, e.g., a relay UE, in case is configured by the network node 110 with an SDT configuration and in case the triggering conditions for using SDT may be fulfilled, the first wireless device 131 may decide to use SDT and thus trigger the random access procedure towards the cell in which the first wireless device 131 may be camping in, and eventually suspend or release the sidelink relay connection. In one sub-example, the first wireless device 131, e.g., the remote UE, may not trigger random access via the second wireless device 132, e.g., the relay UE, but instead trigger random access via a direct Uu link that may be available at the remote UE, that is, the link or interface between the first wireless device 131 and the network node 110, e.g., gNB. In another sub-example, if the first wireless device 131, e.g., the remote UE, decides to use SDT and to trigger random access towards a cell in which it is camping in, the remote UE may decide to suspend or release the sidelink relay connection with the second wireless device 132, e.g., the relay UE. Before suspending or releasing the sidelink relay connection, the first wireless device 131 may also inform the second wireless device 132, e.g., the relay UE, and/or the network node 110.

Examples of these actions, messages and the indications are provided later in this document.

Figure 9:
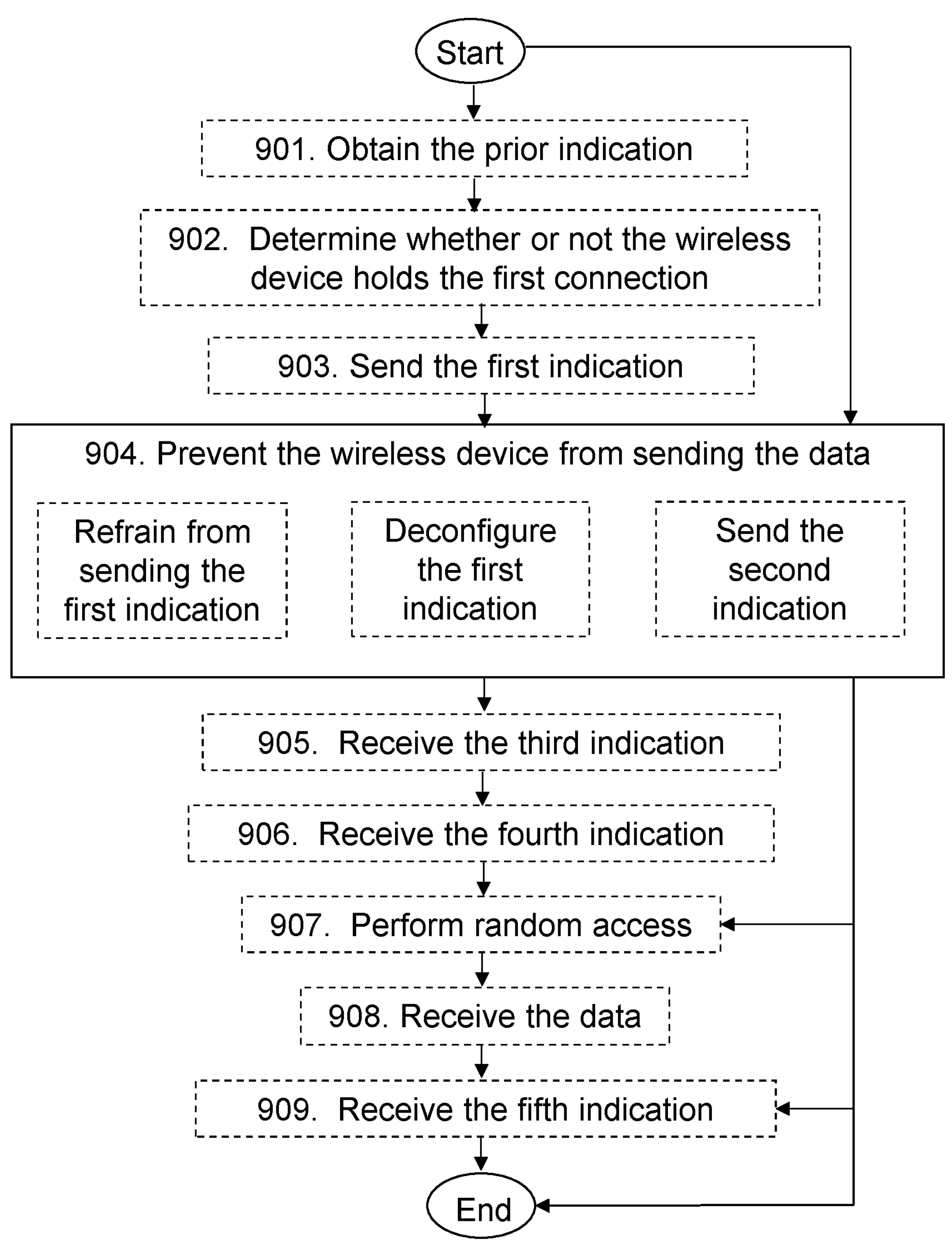
FIG. 9 is a flowchart depicting an example of a method performed by a network node, according to embodiments herein.

Embodiments of a method, performed by a network node, such as the network node 110, will now be described with reference to the flowchart depicted in FIG. 9. The method may be understood to be for handling the transmission of the data by the first wireless device 131. The network node 110 operates in a wireless communications network, such as the wireless communications network 100.

Several embodiments are comprised herein. In some embodiments all the actions may be performed. In some embodiments, one or more actions may be performed. In particular non-limiting examples, Action 904 may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the network node 110 is depicted in FIG. 9. Some actions may be performed in a different order than that shown FIG. 9. In FIG. 9, optional actions are represented with dashed lines. The detailed description of some of the following corresponds to the same references provided above, in relation to the actions described for the first wireless device 131 and will thus not be repeated here to simplify the description. For example, that the size of the buffer comprising the data may be smaller than the threshold may be understood to mean that the data may be "small data".

In particular examples of the embodiments herein, the network node 110 is a radio network node.

Action 901

In this Action 901, the network node 110 may obtain the prior indication.

The obtaining in this Action 901 may be, e.g., from one of the wireless device 131, 132, e.g., via the second link 142 and/or the third link 143 and the first link 141, the first wireless device 131 holding the first connection with the network node 110 via a second wireless device 132, e.g., via the third link 143 and the first link 14, 1 and the second wireless device 132, e.g., via the third link 143. The obtaining may comprise retrieving the prior indication form a memory.

The prior indication may indicate that the first wireless device 131 holds the first connection with the network node 110.

Action 902

In this Action 902, the network node 110 may determine whether or not the first wireless device 131 holds the first connection with the network node 110.

Determining may be understood as calculating, deriving or similar.

The determining in this Action 902 may optionally be based on the obtained prior indication.

Action 903

In some embodiments, in this Action 903, the network node 110 may send the first indication. The first indication may indicate a trigger to transmit the data to the network node 110 in inactive state, wherein the size of the buffer comprising the data may be smaller than the threshold The sending in this Action 903 may be to first wireless device 131.

Sending may be understood as transmitting, or providing, e.g., via the third link 143.

Action 904

In this Action 904, the network node 110 prevents the first wireless device 131 from sending the data.

The network node 110 may prevent the first wireless device 131 from sending the data to the network node 110 in inactive state.

The network node 110 may prevent the first wireless device from sending the data to the network node 110 in inactive state, with the proviso the first wireless device 131 holds the first connection with the network node 110. The first connection comprises the sidelink with another wireless device 132, that is, the second network node 132. The size of the buffer comprising the data is smaller than the threshold.

The preventing in this Action 904 may be performed by one of the following options. According to a first option, the preventing in this Action 904 may be performed by refraining from sending the first indication to the first wireless device 131. As stated earlier, the first indication may indicate the trigger to transmit the data to the network node 110 in inactive state; the size of the buffer comprising the data may be smaller than the threshold. According to a second option, the preventing in this Action 904 may be performed by deconfiguring the first indication from the first wireless device 131. According to a third option, the preventing in this Action 904 may be performed by sending the second indication to the first wireless device 131; the second indication may indicate that the first indication, previously configured at the first wireless device 131 is not to be used; the second indication may be one of explicit and implicit.

Some of the examples below describe how the network node 110 may not configure SDT for a UE such as any of the first wireless device 131 and the second wireless device 132. This may comprise either that the network node 110 may refrain from configuring SDT for the first wireless device 131 and/or the second wireless device 132, which the network node 110 may have done otherwise, see details in the actual examples, but it may also comprise that the network node 110, according to the second option of the three options previously mentioned in this Action, may deconfigure SDT for the first wireless device 131 and/or the second wireless device 132.

In one example, according to the first option of the three options previously mentioned in this Action, if a UE, that is, either a remote UE such as the first wireless device 131 or relay UE such as the second wireless device 132, is involved in sidelink relay operations, the network node 110 may not configure SDT for this UE. Alternatively, according to the third option of the three options previously mentioned in this Action, the network node 110 may still configure the SDT to this UE and may simply use an implicit or explicit indication such as the second indication to signal to the UE whether it may use SDT or not. The implicit indication may be the network node 110 sending a sidelink relay related configuration to the UE, e.g., the first wireless device 131, and thus in this case, the UE may understand that the SDT framework may not be used. The explicit indication, instead, may be a one bit indication sent by the network node 110 to the UE, e.g., the first wireless device 131, to activate or deactivate the SDT framework at the UE, e.g., the first wireless device 131. The explicit indication may also be something more complex, such as including a one bit indicator to activate or deactivate the SDT framework at the UE, e.g., the first wireless device 131, but may also include a timer to indicate to the UE, e.g., the first wireless device 131, for how long the SDT framework may be activated or deactivated. This may be understood to mean that when the timer expires, the UE, e.g., the first wireless device 131, may switch back to the original status for the SDT framework.

In some examples, the preventing in this Action 904 may be based on the obtained prior indication in Action 901 and the determining performed in Action 902.

In another example, the network node 110 may not configure SDT for those UEs from which a sidelink-related RRC message or a message including sidelink fields, parameters, or information may have been received. An example of sidelink-related RRC message may be the SidelinkUEInformation message, the UEAssistanceInformation message, and any other RRC message sent by the UE, e.g., the first wireless device 131, to the network node 110 that may include sidelink field, parameters, or information. In another sub-example, the SDT may not be configured by the network node 110 for all the UEs such as the first wireless device 131 that may send an explicit indication that may be establishing, already have, or going to have a sidelink relay connection. In this case, the UE sending the indication may be the remote UE, e.g., the first wireless device 131, or the relay UE, e.g., the second wireless device 132.

In one example, the network node 110 may not configure SDT if the remote UE, e.g., the first wireless device 131, is connected to the network node 110 via a relay UE, e.g., the second wireless device 132, and this relay UE is in RRC_CONNECTED. Here, the network node 110 may be aware of the RRC state of the relay UE, e.g., the second wireless device 132, and may configure/deconfigure, or activate/deactivate, the SDT framework on the remote UE, e.g., the first wireless device 131, before, or after, changing the RRC state of the relay UE. In a sub-example, the relay UE, e.g., the second wireless device 132, may also report to the network node 110 when the remote UE, e.g., the first wireless device 131, may change its RRC state autonomously, e.g., due to an RLF, but may still have a PC5 connection, so that the remote UE, e.g., first wireless device 131, and relay UE, e.g., the second wireless device 132, may still communicate with each other. Therefore, based on the RRC state of the remote UE, the network node 110 may configure/deconfigure, or activate/deactivate, the SDT framework on the remote UE.

In another example, the network node 110 may not configure SDT for any UE that may request a sidelink-related SIB/SI on-demand, e.g., SIB12. In this case, the UE requesting the SIB/SI on-demand from the network node 110 may be a remote UE or a relay UE. Once received this on-demand request, the network node 110 may decide to configure/deconfigure, or activate/deactivate, the SDT framework on the remote UE, the relay UE, or both.

In one example, in case the network node 110 may not configure SDT for a UE such as the first wireless device 131, it may be understood to mean that the network node 110 may use an implicit or explicit indication such as the second indication to signal to the UE, e.g., the first wireless device 131, on whether it may use SDT or not. The implicit indication may be the network node 110 sending a sidelink relay related configuration to the UE, e.g., the first wireless device 131, and thus, in this case, the UE, e.g., the first wireless device 131, may understand that the SDT framework may not be used. The explicit indication, instead, it may be a one bit indication sent by the network node 110 to the UE, e.g., the first wireless device 131, to activate or deactivate the SDT framework at the UE, e.g., the first wireless device 131. The explicit indication may also be something more complex such as including a one bit indicator to activate or deactivate the SDT framework at the UE, e.g., the first wireless device 131, but may also include a timer to indicate to the UE, e.g., the first wireless device 131, for how long the SDT framework may be activated or deactivated, this may be understood to mean that when the timer expires, the UE, e.g., the first wireless device 131, may switch back to the original status for the SDT framework. The said explicit indicator may be provided to the UE, e.g., the first wireless device 131, in a dedicated signaling, e.g., RRC, message or in broadcast system information, e.g., in a SIB, to activate the behavior in all UEs, e.g., the first wireless device 131, with proper configuration camping in the same cell.

In another example, in case the network node 110 may not configure SDT for a UE such as the first wireless device 131, it may be understood to mean that the network node 110 may inform the relay UE, e.g., the second wireless device 132, first that the SDT framework may be configured/deconfigured, or activated/deactivated, at the remote UE, e.g., the first wireless device 131, and then the relay UE, e.g., the second wireless device 132, may inform via the PC5 interface the remote UE, e.g., the first wireless device 131, about the network node 110 decision. In this case, the remote UE, e.g., the first wireless device 131, may also acknowledge the indication received by the relay UE, e.g., the second wireless device 132, and the relay UE, e.g., the second wireless device 132, may also acknowledge the indication received by the network node 110. Alternatively, the remote UE may directly acknowledge the network indication directly to the network node 110 via the relay UE, e.g., the second wireless device 132, the relay UE may send the acknowledge transparently to the network node 110.

In the UE examples above, it is described how a UE such as the first wireless device 131 may indicate to the network node 110 that the UE may have an SDT configuration but that the UE may currently not be using, e.g., due to being connected to a relay such as the second wireless device 132. In one example, the network node 110 may in response to receiving such an indication from the UE deconfigure SDT for the UE. This may be understood to be beneficial since the network node 110 may then use the resources associated to the SDT configuration of the UE for some other UE instead.

Action 905

In this Action 905, the network node 110 may receive the third indication.

The receiving in this Action 905 may be from the first wireless device 131 holding the first connection with the network node 110 via the second wireless device 132, e.g., via the third link 143 and the first link 141.

The third indication may indicate the acknowledgement of receipt of the second indication.

In some examples, the receiving in this Action 905 may be from the second wireless device 132, e.g., via the third link 143.

Action 906

In this Action 906, the network node 110 may receive the fourth indication.

The receiving in this Action 906 may be from the first wireless device 131, e.g., via the third link 143 and the first link 141.

The fourth indication may indicate that the first wireless device 131 has one of: discarded and stored the first indication.

Action 907

In some of the embodiments wherein the one or more criteria may be fulfilled for the transmission of the data by the first wireless device 131, in this Action 907, the network node 110 may perform random access. This may be understood to mean that while it may be the first wireless device 131 that may initiate the random access, the network node 110 may attend to the random access signalling from the first wireless device 131 and perform any necessary signalling exchange.

The performing in this Action 907 of the random access may be with the first wireless device 131 via one of: a) the second connection with the first wireless device 131, the second connection being a direct connection, and b) via the first connection with the second wireless device 132.

Action 908

In some of the embodiments wherein the one or more criteria may be fulfilled for the transmission of the data by the first wireless device 131, in this Action 908, the network node 110 may receive the data.

In some embodiments, the network node 110 may perform the random access via the direct second connection. The receiving in this Action 906 may be from the first wireless device 131, e.g., via the third link 143 and the first link 141.

The receiving in this Action 908 may be from the first wireless device 131 in connected mode, as a result of having performed the random access, e.g., via the second link 142.

Action 909

In some embodiments, the network node 110 may perform the random access via the direct second connection. In some of such embodiments, in this Action 909, the network node 110 may receive the fifth indication.

The receiving in this Action 909 may be from the first wireless device 131, e.g., via the second link 142 and/or the third link 143 and the first link 141.

The fifth indication may indicate that the first connection is to be released. The second wireless device 132 may be informed.

Examples of these actions and the messages and indications are provided later in this document.

COMMON EXAMPLES

In one example, the approaches and methods described in all the previous examples the first wireless device 131 may use may be decided by the network node 110, e.g., a gNB, and communicated to the first wireless device 131 via dedicated RRC signaling of via system information. As another alternative, which option(s) the first wireless device 131 may use may be decided by Transmit (TX)/Receive (RX) UE or may be pre-configured, e.g., hard-coded in the specification.

In another example, for any of the above examples, the signaling alternatives described may include at least one of the below.

For signaling between first wireless device 131 and the network node 110, e.g., gNB: RRC signaling, MAC Control Element (CE), L1 signaling on channels such as PRACH, Physical Uplink Control CHannel (PUCCH), PDCCH, Control PDU of a protocol layer such as Service Data Adaption Protocol (SDAP), PDCP, RLC or an adaptation layer which may be introduced for responsible of duplication function.

For signaling between UEs: RRC signaling, e.g., PC5-RRC, PC5-S signaling, Discovery signaling, MAC CE, L1 signaling on channels such as PSSCH, PSCCH, or PSFCH, and Control PDU of a protocol layer such as SDAP, PDCP, RLC or an adaptation layer which may be introduced for responsible of duplication function.

As a summarized overview of the foregoing, some embodiments herein may be understood to discard or not use the network-provided SDT configuration in case the first wireless device 131 may be involved in sidelink relay-related procedures, or for the first wireless device 131 to trigger RA over Uu link towards the network node 110, e.g., gNB, if possible. For the network node 110, some embodiments herein may comprise to not configure SDT based on conditions which may tell the network node 110, e.g., gNB, the first wireless device 131 may be involved in relaying.

Certain embodiments disclosed herein may provide one or more of the following technical advantage(s), which may be summarized as follows. The methods and approaches disclosed herein may be understood to aim at clarifying what may be the network node 110 and first wireless device 131 actions when SDT may be configured by the network node 110 for a remote UE such as the first wireless device 131 involved in sidelink relay operations. According to some embodiments herein, the network node 110 may never configure SDT for a UE such as the first wireless device 131 that may be involved in sidelink relay operation and, even if this happens, a remote UE such as the first wireless device 131 may never use the SDT framework to send traffic to the network node 110.

This may be understood to avoid long connectivity interruption for the first wireless device 131 but also prevent the signaling overhead, power consumption, and latency to be increased at the first wireless device 131 and network node 110 side.

Figure 10:
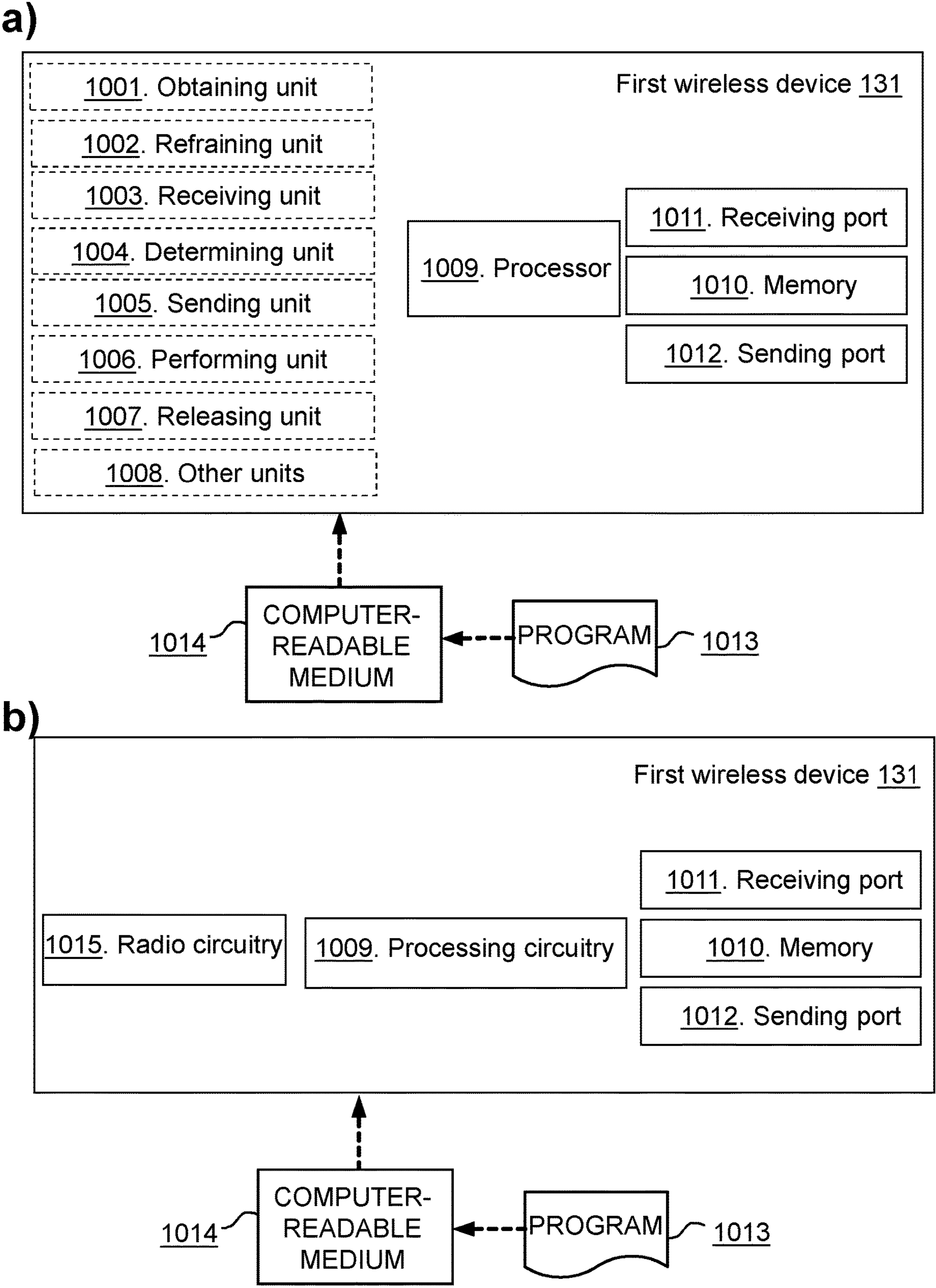
FIG. 10 is a schematic block diagram illustrating two non-limiting examples, a) and b), of a first wireless device, according to embodiments herein.

FIG. 10 depicts two different examples in panels a) and b), respectively, of the arrangement that the first wireless device 131 may comprise. In some embodiments, the first wireless device 131 may comprise the following arrangement depicted in FIG. 10*a*. The first wireless device 131 may be understood to be for handling the transmission of data. The first wireless device 131 is configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first wireless device 131, and will thus not be repeated here. For example, the in some embodiments, the network node 110 may be configured to be the radio network node 111, e.g., a gNB, while in other embodiments the network node 110 may be configured to be the core network node 112 e.g., an AMF. The first wireless device 131 may be configured to be a UE.

In FIG. 10, optional units are indicated with dashed boxes.

The first wireless device 131 is configured to perform the obtaining of Action 802, e.g., by means of an obtaining unit 1001 within the first wireless device 131, configured to obtain the first indication configured to indicate the trigger to transmit the data to the network node 110, in inactive state. The size of the buffer configured to comprise the data is configured to be smaller than the threshold. The first wireless device 131 is configured to hold the first connection to the network node 110 via the second wireless device 132.

The first wireless device 131 is configured to perform the refraining of Action 805, e.g., by means of a refraining unit 1002 within the first wireless device 131, configured to refrain from sending the data to the network node 110 in inactive state via the second wireless device 132. The refraining is configured to be based on the first wireless device 131 holding the first connection to the network node 110 via the second wireless device 132.

In some embodiments, one of the following options may apply. According to a first option, the first wireless device 131 may be further configured to refrain from sending the data to the network node 110 directly, in inactive state. According to a second option, the first wireless device 131 may be configured to send the data to the network node 110 with the proviso that the first wireless device 131 holds the second connection to the network node 110. The second connection may be configured to be the direct connection.

In some embodiments, one of the following options may apply. According to a first option, the refraining may be configured to be based on the first indication having been deconfigured from the first wireless device 131 by the network node 110. According to a second option, the refraining may be configured to be further based on the first wireless device 131 being out of coverage of any cell. According to a third option, the first wireless device 131 may be configured to hold the second connection to the network node 110.

In some embodiments, wherein the first indication may be configured to be the configuration received from the network node 110, and the configuration may be configured to configure the first wireless device 131 to transmit data to the network node 110 in inactive state, wherein the size of the buffer configured to comprise the data may be smaller than the threshold, the first wireless device 131, optionally, may be further configured to perform the receiving of Action 803, e.g., by means of a receiving unit 1003 within the first wireless device 131, configured to receive the second indication from the network node 110. The second indication may be further configured to indicate that the first indication, previously configured at the wireless device 131, 132 is not to be used. The second indication may be configured to be one of explicit and implicit.

In some embodiments, wherein the first indication may be configured to be the configuration received from the network node 110, and the configuration may be configured to configure the first wireless device 131 to transmit data to the network node 110 in inactive state, wherein the size of the buffer configured to comprise the data may be smaller than the threshold, the first wireless device 131 may be further configured to perform the determining of Action 804, e.g. by means of a determining unit 1004 within the first wireless device 131, configured to determine to perform one of: i) discard the first indication configured to be received, and ii) store the first indication configured to be received. The determining may be optionally configured to be based on the second indication configured to be received.

In some embodiments, wherein the first indication may be configured to be the configuration received from the network node 110, and the configuration may be configured to configure the first wireless device 131 to transmit data to the network node 110 in inactive state, wherein the size of the buffer configured to comprise the data may be smaller than the threshold, the first wireless device 131, optionally, may be further configured to perform the sending in this Action 806, e.g. by means of a sending unit 1005 within the first wireless device 131, configured to send the third indication to the network node 110. The third indication may be configured to indicate the acknowledgement of receipt of the second indication.

In some embodiments, wherein the first indication may be configured to be the configuration received from the network node 110, and the configuration may be configured to configure the first wireless device 131 to transmit data to the network node 110 in inactive state, wherein the size of the buffer configured to comprise the data may be smaller than the threshold, the first wireless device 131 may be further configured to perform the sending of Action 807, e.g. by means of the sending unit 1005 within the first wireless device 131, configured to send the fourth indication to the network node 110. The fourth indication may be configured to indicate, based on the result of the determination, that the first wireless device 130 has one of: discarded and stored the first indication.

In some embodiments, the first wireless device 131 may be configured to perform the performing of Action 808, e.g. by means of a performing unit 1006 within the first wireless device 131, configured to, wherein the one or more criteria for transmission of the data may be fulfilled, perform random access towards the network node 110 via one of: a) the second connection to the network node 110, the second connection being configured to be a direct connection, and b) via the first connection with the second wireless device 132.

The first wireless device 131 may be configured to perform the sending of Action 809, e.g., by means of the sending unit 1005 within the first wireless device 131, configured to, wherein the one or more criteria for transmission of the data may be fulfilled, send the data to the network node 110 in connected mode, as a result of having performed the random access.

In some embodiments wherein the first wireless device 131 may be configured to perform the random access via the direct second connection, the first wireless device 131 may be configured to perform the sending of Action 810, e.g., by means of the sending unit 1005 within the first wireless device 131, configured to send the fifth indication to one of the network node 110 and the second wireless device 132. The fifth indication may be configured to indicate that the first connection is to be released.

In some embodiments wherein the first wireless device 131 may be configured to perform the random access via the direct second connection, the first wireless device 131 may be configured to perform the releasing of Action 811, e.g. by means of a releasing unit 1007 within the first wireless device 131, configured to release the first connection, based on the fifth indication configured to be sent.

The first wireless device 131 may be configured to perform the sending of Action 801, e.g., by means of the sending unit 1005 within the first wireless device 131, configured to send the prior indication to the network node 110. The prior indication may be configured to indicate that the first wireless device 131 holds the first connection with the network node 110.

Other units 1008 may be comprised in the first wireless device 131.

The embodiments herein in the first wireless device 131 may be implemented through one or more processors, such as a processor 1009 in the first wireless device 131 depicted in FIG. **10*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first wireless device 131. One such carrier may be in the form of a CD ROM disc. It is however feasible with other data carriers such as a memory stick. The computer program code may furthermore be provided as pure program code on a server and downloaded to the first wireless device 131**.

The first wireless device 131 may further comprise a memory 1010 comprising one or more memory units. The memory 1010 is arranged to be used to store obtained information, store data, configurations, schedulings, and applications etc. to perform the methods herein when being executed in the first wireless device 131.

In some embodiments, the first wireless device 131 may receive information from, e.g., the network node 110, the second wireless device 132 and/or another node, through a receiving port 1011. In some embodiments, the receiving port 1011 may be, for example, connected to one or more antennas in first wireless device 131. In other embodiments, the first wireless device 131 may receive information from another structure in the wireless communications network 100 through the receiving port 1011. Since the receiving port 1011 may be in communication with the processor 1009, the receiving port 1011 may then send the received information to the processor 1009. The receiving port 1011 may also be configured to receive other information.

The processor 1009 in the first wireless device 131 may be further configured to transmit or send information to e.g., the network node 110, the second wireless device 132, another node, and/or another structure in the wireless communications network 100, through a sending port 1012, which may be in communication with the processor 1009, and the memory 1010.

Those skilled in the art will also appreciate that the units 1001-1008 described above may refer to a combination of analog and digital circuits, and/or one or more processors configured with software and/or firmware, e.g., stored in memory, that, when executed by the one or more processors such as the processor 1009, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1001-1008 described above may be implemented as one or more applications running on one or more processors such as the processor 1009.

Thus, the methods according to the embodiments described herein for the first wireless device 131 may be respectively implemented by means of a computer program 1013 product, comprising instructions, i.e., software code portions, which, when executed on at least one processor 1009, cause the at least one processor 1009 to carry out the actions described herein, as performed by the first wireless device 131. The computer program 1013 product may be stored on a computer-readable storage medium 1014. The computer-readable storage medium 1014, having stored thereon the computer program 1013, may comprise instructions which, when executed on at least one processor 1009, cause the at least one processor 1009 to carry out the actions described herein, as performed by the first wireless device 131. In some embodiments, the computer-readable storage medium 1014 may be a non-transitory computer-readable storage medium, such as a CD ROM disc, or a memory stick. In other embodiments, the computer program 1013 product may be stored on a carrier containing the computer program 1013 just described, wherein the carrier is one of an electronic signal, optical signal, radio signal, or the computer-readable storage medium 1014, as described above.

The first wireless device 131 may comprise a communication interface configured to facilitate communications between the first wireless device 131 and other nodes or devices, e.g., the network node 110, the second wireless device 132, another node, and/or another structure in the wireless communications network 100. The interface may, for example, include a transceiver configured to transmit and receive radio signals over an air interface in accordance with a suitable standard.

In other embodiments, the first wireless device 131 may comprise the following arrangement depicted in FIG. 10*b*. The first wireless device 131 may comprise a processing circuitry 1009, e.g., one or more processors such as the processor 1009, in the first wireless device 131 and the memory 1010. The first wireless device 131 may also comprise a radio circuitry 1015, which may comprise e.g., the receiving port 1011 and the sending port 1012. The processing circuitry 1009 may be configured to, or operable to, perform the method actions according to FIG. 8, and/or FIGS. 15-19, in a similar manner as that described in relation to FIG. 10*a*. The radio circuitry 1015 may be configured to set up and maintain at least a wireless connection with the network node 110, the second wireless device 132, another node, and/or another structure in the wireless communications network 100. Circuitry may be understood herein as a hardware component.

Hence, embodiments herein also relate to the first wireless device 131 operative to operate in the wireless communications network 100. The first wireless device 131 may comprise the processing circuitry 1009 and the memory 1010, said memory 1010 containing instructions executable by said processing circuitry 1009, whereby the first wireless device 131 is further operative to perform the actions described herein in relation to the first wireless device 131, e.g., in FIG. 8 and/or FIGS. 15-19.

It may be understood that the second wireless device 132 may comprise hardware components, and optionally units, equivalent to those described for the first wireless device 131, to perform the methods described herein by the second wireless device 132.

Figure 11:
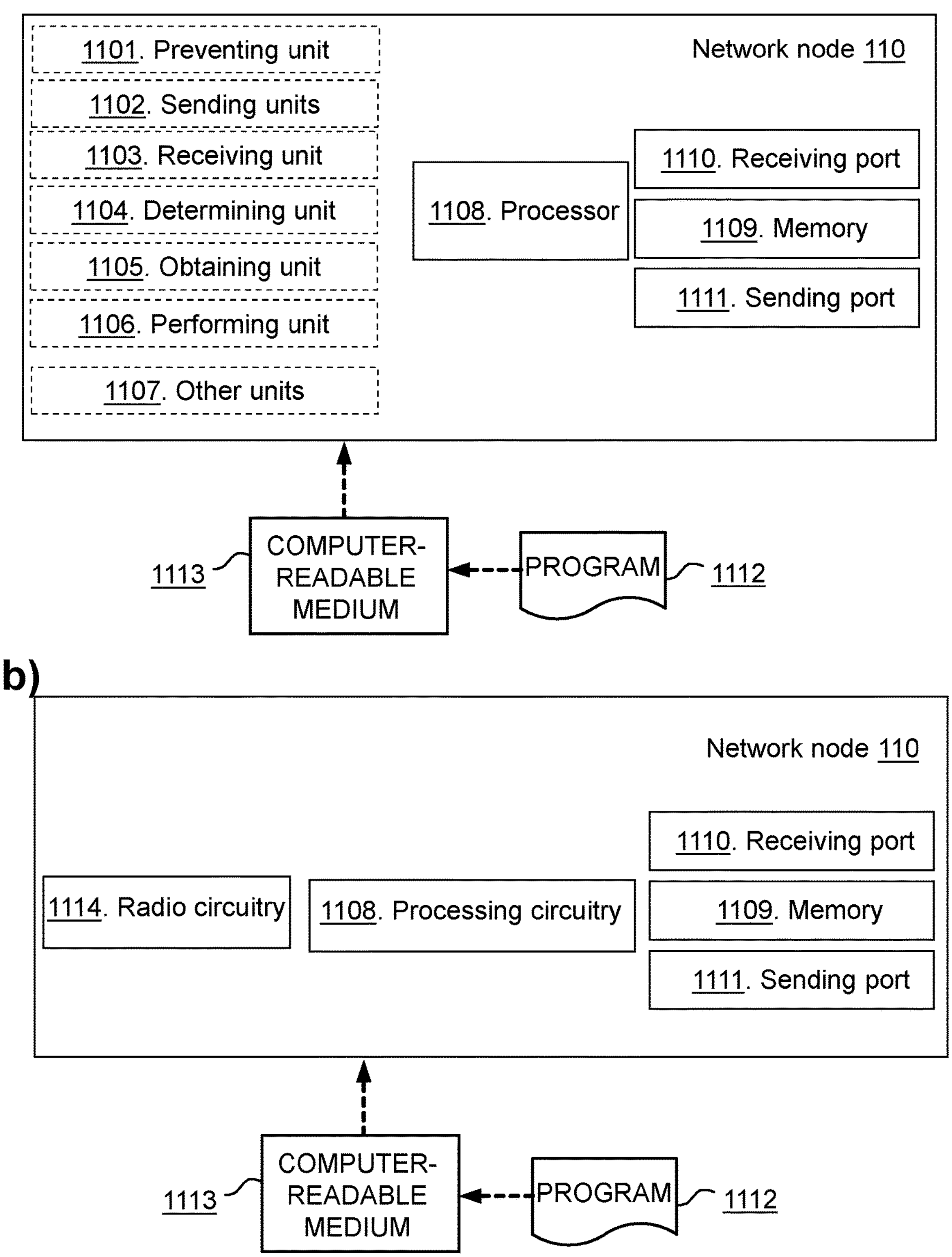
FIG. 11 is a schematic block diagram illustrating two non-limiting examples, a) and b), of a network node, according to embodiments herein.

FIG. 11 depicts two different examples in panels a) and b), respectively, of the arrangement that the network node 110 may comprise. In some embodiments, the network node 110 may comprise the following arrangement depicted in FIG. 11*a*. The network node 110 may be understood to be for handling the transmission of the data by the first wireless device 131. The network node 110 is configured to operate in the wireless communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first wireless device 131 and will thus not be repeated here. For example, the in some embodiments, the network node 110 may be configured to be the radio network node 111, e.g., a gNB, while in other embodiments the network node 110 may be configured to be the core network node 112 e.g., an AMF. The first wireless device 131 may be configured to be a UE.

In FIG. 11, optional units are indicated with dashed boxes.

The network node 110 is configured to perform the preventing of Action 904, e.g., by means of a preventing unit 1101 within the network node 110, configured to prevent the first wireless device 131 from sending the data to the network node 110, in inactive state, with the proviso the first wireless device 131 holds the first connection with the network node 110. The first connection is configured to comprise the sidelink with the second wireless device 132, wherein the size of the buffer configured to comprise the data is configured to be smaller than the threshold.

In some embodiments, the preventing may be configured to be performed by one of the following options may apply. According to a first option, the preventing may be configured to be performed by: i) refraining from sending the first indication to the first wireless device 131. The first indication may be configured to indicate the trigger to transmit the data to the network node 110 in inactive state. The size of the buffer configured to comprise the data may be configured to be smaller than the threshold. According to a second option, the preventing may be configured to be performed by ii) deconfiguring the first indication from the first wireless device 131. According to a third option, the preventing may be configured to be performed by sending the second indication to the first wireless device 131. The second indication may be configured to indicate that the first indication, previously configured at the first wireless device 131 is not to be used. The second indication may be configured to be one of explicit and implicit.

The network node 110 may be configured to perform the sending of Action 903, e.g., by means of a sending unit 1102 within the network node 110, configured to send the first indication to the first wireless device 131.

The network node 110 may be configured to perform the receiving of Action 905, e.g. by means of a receiving unit 1103 within the network node 110, configured to receive the third indication from the first wireless device 131 configured to be holding the first connection with the network node 110 via the second wireless device 132. The third indication may be configured to indicate the acknowledgement of receipt of the second indication.

The network node 110 may be configured to perform the receiving of this Action 906, e.g. by means of the receiving unit 1103, configured to receive the fourth indication from the first wireless device 131. The fourth indication may be configured to indicate that the first wireless device 131 has one of: discarded and stored the first indication.

The network node 110 may be configured to perform the determining of Action 902, e.g. by means of a determining unit 1104 within the network node 110, configured to determine whether or not the first wireless device 131 holds the first connection with the network node 110.

The network node 110 may be configured to perform the obtaining of Action 901, e.g., by means of an obtaining unit 1105 within the network node 110, configured to obtain the prior indication. The prior indication the configured to indicate that the first wireless device 131 holds the first connection with the network node 110. The determining may be configured to be optionally based on the prior indication configured to be obtained.

The network node 110 may be configured to perform the performing in Action 907, e.g., by means of a performing unit 1106 within the network node 110, configured to, wherein the one or more criteria may be fulfilled for the transmission of the data, perform random access with the first wireless device 131 via one of: a) the second connection with the first wireless device 131, the second connection being configured to be a direct connection, and b) via the first connection with the second wireless device 132.

In some embodiments, the network node 110 may be configured to perform the receiving of Action 908, e.g., by means of the receiving unit 1103, configured to, wherein the one or more criteria may be fulfilled for the transmission of the data, receive the data from the first wireless device 131 in connected mode, as a result of having performed the random access.

In some embodiments wherein the network node 110 may be configured to perform the random access via the direct second connection, the network node 110 may be configured to perform the receiving of Action 909, e.g., by means of the receiving unit 1103, configured to receive the fifth indication from the first wireless device 131. The fifth indication may be configured to indicate that the first connection is to be released.

Other units 1105 may be comprised in the network node 110.

The embodiments herein in the network node 110 may be implemented through one or more processors, such as a processor 1108 in the network node 110 depicted in FIG. 11*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1109 comprising one or more memory units. The memory 1109 is arranged to be used to store obtained information, store data, configurations, schedulings, and applications etc. to perform the methods herein when being executed in the network node 110.

In some embodiments, the network node 110 may receive information from, e.g., the first wireless device 131, the second wireless device 132 and/or another node, through a receiving port 1110. In some embodiments, the receiving port 1110 may be, for example, connected to one or more antennas in network node 110. In other embodiments, the network node 110 may receive information from another structure in the wireless communications network 100 through the receiving port 1110. Since the receiving port 1110 may be in communication with the processor 1108, the receiving port 1110 may then send the received information to the processor 1108. The receiving port 1110 may also be configured to receive other information.

The processor 1108 in the network node 110 may be further configured to transmit or send information to e.g., the first wireless device 131, the second wireless device 132, another node, and/or another structure in the wireless communications network 100, through a sending port 1111, which may be in communication with the processor 1108, and the memory 1109.

Those skilled in the art will also appreciate that the units 1101-1107 described above may refer to a combination of analog and digital circuits, and/or one or more processors configured with software and/or firmware, e.g., stored in memory, that, when executed by the one or more processors such as the processor 1108, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1101-1107 described above may be implemented as one or more applications running on one or more processors such as the processor 1108.

Thus, the methods according to the embodiments described herein for the network node 110 may be respectively implemented by means of a computer program 1112 product, comprising instructions, i.e., software code portions, which, when executed on at least one processor 1108, cause the at least one processor 1108 to carry out the actions described herein, as performed by the network node 110. The computer program 1112 product may be stored on a computer-readable storage medium 1113. The computer-readable storage medium 1113, having stored thereon the computer program 1112, may comprise instructions which, when executed on at least one processor 1108, cause the at least one processor 1108 to carry out the actions described herein, as performed by the network node 110. In some embodiments, the computer-readable storage medium 1113 may be a non-transitory computer-readable storage medium, such as a CD ROM disc, or a memory stick. In other embodiments, the computer program 1112 product may be stored on a carrier containing the computer program 1112 just described, wherein the carrier is one of an electronic signal, optical signal, radio signal, or the computer-readable storage medium 1113, as described above.

The network node 110 may comprise a communication interface configured to facilitate communications between the network node 110 and other nodes or devices, e.g., the first wireless device 131, the second wireless device 132, another node, and/or another structure in the wireless communications network 100. The interface may, for example, include a transceiver configured to transmit and receive radio signals over an air interface in accordance with a suitable standard.

In other embodiments, the network node 110 may comprise the following arrangement depicted in FIG. 11*b*. The network node 110 may comprise a processing circuitry 1108, e.g., one or more processors such as the processor 1108, in the network node 110 and the memory 1109. The network node 110 may also comprise a radio circuitry 1114, which may comprise e.g., the receiving port 1110 and the sending port 1111. The processing circuitry 1108 may be configured to, or operable to, perform the method actions according to FIG. 9 and/or FIGS. 15-19, in a similar manner as that described in relation to FIG. 11*a*. The radio circuitry 1114 may be configured to set up and maintain at least a wireless connection with the first wireless device 131, the second wireless device 132, another node, and/or another structure in the wireless communications network 100. Circuitry may be understood herein as a hardware component.

Hence, embodiments herein also relate to the network node 110 operative to operate in the wireless communications network 100. The network node 110 may comprise the processing circuitry 1108 and the memory 1109, said memory 1109 containing instructions executable by said processing circuitry 1108, whereby the network node 110 is further operative to perform the actions described herein in relation to the network node 110, e.g., in FIG. 9 and/or FIGS. 15-19.

Selected examples according to embodiments herein:

EXAMPLES

Example 1. A method performed by a first wireless device (131), the method being for handling transmission of data, the first wireless device (131) operating in a wireless communications network (100), and the method comprising:

obtaining (802) a first indication indicating a trigger to transmit data to a network node (110), e.g., in inactive state, wherein a size of a buffer comprising the data is smaller than a threshold, and wherein the first wireless device (131) holds a first connection to the network node (110) via a second wireless device (132), and refraining (805) from sending the data to the network node (110) in inactive state via the second wireless device (132), the refraining being based on the first wireless device (131) holding the first connection to the network node (110) via the second wireless device (132).

Example 2. The method according to example 1, wherein one of:

the first wireless device (131) further refrains from sending the data to the network node (110) directly, in inactive state, and the first wireless device (131) sends the data to the network node (110) with the proviso that the first wireless device (131) holds a second connection to the network node (110), the second connection being a direct connection.

Example 3. The method according to example 2, wherein one of:

the refraining (805) is based on the first indication having been deconfigured from the first wireless device (131) by the network node (110), e.g., by receiving a deconfiguration instruction from the network node (110), the refraining (805) is further based on the first wireless device (131) being out of coverage of any cell, and the first wireless device (131) holds the second connection to the network node (110).

Example 4. The method according to example 1, wherein the first indication is a configuration received from the network node (110), the configuration configuring the first wireless device (131) to transmit data to the network node (110) in inactive state, wherein the size of the buffer comprising the data is smaller than the threshold, and wherein the method further comprises:

optionally, receiving (803) a second indication from the network node (110), the second indication indicating that the first indication, previously configured at the wireless device (131, 132) is not to be used, the second indication being one of explicit and implicit, determining (804) to perform one of:

i. discarding the received first indication, and ii. storing the received first indication, and wherein the determining (804) is optionally based on the received second indication, optionally, sending (806) a third indication to the network node (110), the third indication indicating an acknowledgement of receipt of the second indication, and sending (807) a fourth indication to the network node (110), the fourth indication indicating, based on a result of the determination, that the first wireless device (130) has one of: discarded and stored the first indication.

Example 5. The method according to example 1 or 4, wherein one or more criteria for transmission of the data are fulfilled, and wherein the method further comprises:

performing (808) random access towards the network node (110) via one of: a) a second connection to the network node (110), the second connection being a direct connection, and b) via the first connection with the second wireless device (132), and sending (809) the data to the network node (110) in connected mode, as a result of having performed the random access.

Example 6. The method according to example 5, wherein the first wireless device (131) performs the random access via the direct second connection, and wherein the method further comprises:

sending (810) a fifth indication to the network node (110), the fifth indication indicating that the first connection is to be released, and releasing (811) the first connection, e.g., based on the sent fifth indication.

Example 7. The method according to any of examples 1-6, further comprising, sending (801) a prior indication to the network node (110), the prior indication indicating that the first wireless device (131) holds the first connection with the network node (110).

Example 8. A method performed by a network node (110), the method being for handling transmission of data by a wireless device (131, 132), the network node (110) operating in a wireless communications network (100), and the method comprising:

preventing (904) a wireless device (131, 132) from sending the data to the network node (110), e.g., in inactive state, with the proviso the wireless device (131, 132) holds a first connection with the network node (110), wherein the first connection comprises a sidelink with another wireless device (131, 132), wherein a size of a buffer comprising the data is smaller than a threshold.

Example 9. The method according to example 8, wherein the preventing (904) is performed by one of:

i. refraining from sending a first indication to the wireless device (131, 132), the first indication indicating a trigger to transmit the data to the network node (110) in inactive state, wherein a size of a buffer comprising the data is smaller than a threshold, ii. deconfiguring the first indication from the wireless device (131, 132), and iii. sending a second indication to the wireless device (131, 132), the second indication indicating that the first indication, previously configured at the wireless device (131, 132) is not to be used, the second indication being one of explicit and implicit.

Example 10. The method according to example 9, further comprising at least one of:

sending (903) the first indication to the wireless device (131, 132), receiving (905) a third indication from one of the wireless device (131, 132), a first wireless device (131) holding the first connection with the network node (110) via a second wireless device (132), and the second wireless device (132), the third indication indicating an acknowledgement of receipt of the second indication, and receiving (906) a fourth indication from the wireless device (131, 132), the fourth indication indicating that the first wireless device (130) has one of: discarded and stored the first indication.

Example 11. The method according to example 10, further comprising:

determining (902) whether or not the wireless device (131, 132) holds the first connection with the network node (110).

Example 12. The method according to example 11, further comprising:

obtaining (901) a prior indication, the prior indication indicating that the wireless device (131, 132) holds the first connection with the network node (110), wherein the determining (902) is optionally based on the obtained prior indication.

Example 13. The method according to any of examples 8-12, wherein one or more criteria are fulfilled for the transmission of the data by the wireless device (131, 132), and wherein the method further comprises:

performing (907) random access with the wireless device (131, 132) via one of: a) a second connection with a first wireless device (131) holding the first connection with the network node (110) via a second wireless device (132), the second connection being a direct connection, and b) via the first connection with the second wireless device (132), and receiving (908) the data from the first wireless device (131) in connected mode, as a result of having performed the random access.

Example 14. The method according to example 13, wherein the network node (110) performs the random access via the direct second connection, and wherein the method further comprises:

receiving (909) a fifth indication from the first wireless device (131), the fifth indication indicating that the first connection is to be released.

Example 15. A method performed by a wireless device (131, 132), the method being for handling transmission of data, the wireless device (131, 132) operating in a wireless communications network (100), and the method comprising:

obtaining (1202) a first indication indicating a trigger to transmit data to a network node (110), e.g., in inactive state, wherein a size of a buffer comprising the data is smaller than a threshold, and wherein the wireless device (131, 132) holds a first connection to the network node (110) using a sidelink with another wireless device (131, 132), and refraining (1205) from sending the data to the network node (110) in inactive state using a sidelink with another wireless device 131, 132, the refraining being based on the wireless device (131, 132) holding the first connection to the network node (110) using the sidelink with the another wireless device (131, 132).

Example 16. The method according to example 15, wherein one of:

the wireless device (131, 132) further refrains from sending the data to the network node (110) directly, in inactive state, and the wireless device (131, 132) sends the data to the network node (110) with the proviso that the wireless device (131, 132) holds a second connection to the network node (110), the second connection being a direct connection.

Example 17. The method according to example 16, wherein one of:

the refraining (1205) is based on the first indication having been deconfigured from the wireless device (131, 132) by the network node (110), e.g., by receiving a deconfiguration instruction from the network node (110), the refraining (1205) is further based on the wireless device (131, 132) being out of coverage of any cell, and the wireless device (131, 132) holds the second connection to the network node (110).

Example 18. The method according to example 15, wherein the first indication is a configuration received from the network node (110), the configuration configuring the wireless device (131, 132) to transmit data to the network node (110) in inactive state, wherein the size of the buffer comprising the data is smaller than the threshold, and wherein the method further comprises:

optionally, receiving (1203) a second indication from the network node (110), the second indication indicating that the first indication, previously configured at the wireless device (131, 132) is not to be used, the second indication being one of explicit and implicit, determining (1204) to perform one of:

i. discarding the received first indication, and ii. storing the received first indication, and wherein the determining (1204) is optionally based on the received second indication, optionally, sending (1206) a third indication to the network node (110), the third indication indicating an acknowledgement of receipt of the second indication, and sending (1207) a fourth indication to the network node (110), the fourth indication indicating, based on a result of the determination, that the wireless device (131, 132) has one of: discarded and stored the first indication.

Example 19. The method according to example 15 or 18, wherein one or more criteria for transmission of the data are fulfilled, and wherein the method further comprises:

performing (1208) random access towards the network node (110) via one of: a) a second connection to the network node (110), the second connection being a direct connection, and b) via the first connection with the another wireless device (131, 132), and sending (1209) the data to the network node (110) in connected mode, as a result of having performed the random access.

Example 20. The method according to example 19, wherein the wireless device (131, 132) performs the random access via the direct second connection, and wherein the method further comprises:

sending (1210) a fifth indication to the network node (110), the fifth indication indicating that the first connection is to be released, and releasing (1211) the first connection, e.g., based on the sent fifth indication.

Example 21. The method according to any of examples 15-20, further comprising, sending (1201) a prior indication to the network node (110), the prior indication indicating that the wireless device (131, 132) holds the first connection with the network node (110).

FURTHER EXAMPLES RELATED TO EMBODIMENTS HEREIN

The wireless device examples related to embodiments herein relate to FIG. 12, FIG. 13 and FIGS. 15-19.

A method, performed by a wireless device, such as the wireless device 131, 132, is described herein. The method may be understood to be for handling transmission of data. The wireless device 131, 132 may operate in the wireless communications network 100.

Figure 12:
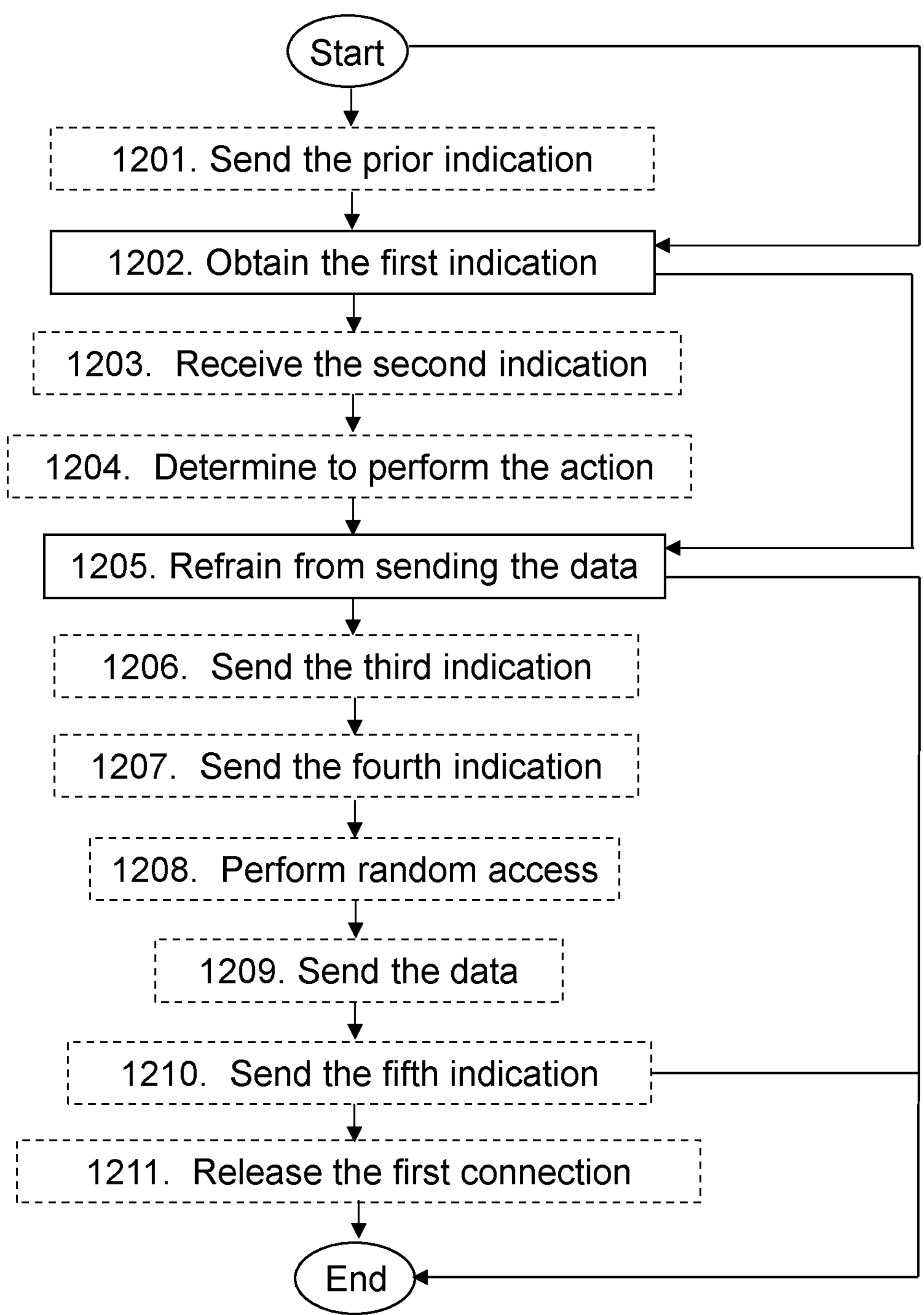
FIG. 12 is a flowchart depicting an example of a method performed by a wireless device, according to embodiments herein.

Several examples related to embodiments herein are comprised herein. In some examples related to embodiments herein all the actions may be performed. In some examples related to embodiments herein, one or more actions may be performed. In particular non-limiting examples, Action 1202 and Action 1205 may be performed. It should be noted that the examples herein are not mutually exclusive. One or more examples may be combined, where applicable. All possible combinations are not described to simplify the description. Components from one example may be tacitly assumed to be present in another example and it will be obvious to a person skilled in the art how those components may be used in the other exemplary examples. A non-limiting example of the method performed by the wireless device 131, 132 is depicted in FIG. 12. Some actions may be performed in a different order than that shown in FIG. 12.

Obtaining 1202 an indication, e.g., a first indication. The wireless device 131, 132 may be configured to perform the obtaining in this Action 1202, e.g., by means of an obtaining unit 1301 within the wireless device 131, 132, configured to perform this action.

The first indication may indicate a trigger to transmit data to the network node 110, e.g., in inactive state.

A size of a buffer comprising the data may be smaller than a threshold. That is, the data may be "small data".

The wireless device 131, 132 may hold a first connection to the network node 110 using a sidelink with another wireless device 131, 132. That is, e.g., the wireless device 132 may be a relay wireless device, and the another wireless device 131 may be a remote wireless device, or vice-versa.

The obtaining in this Action 1202 may comprise retrieving e.g., from an internal memory, or another memory storage, or receiving from e.g., the network node 110, for example, via the third link 143.

In particular examples related to embodiments herein, the network node 110 may be a radio network node.

Refraining 1205 from sending the data. The wireless device 131, 132 may be configured to perform the refraining in this Action 1205, e.g., by means of a refraining unit 1302 within the wireless device 131, 132, configured to perform this action.

The wireless device 131, 132 may refrain from sending the data to the network node 110 in inactive state using the sidelink with the another wireless device 131, 132. The refraining may be based on the wireless device 131, 132 holding the first connection to the network node 110 using the sidelink with the another wireless device 131, 132.

In some examples, one of the following may apply:

the wireless device 131, 132 may further refrain from sending the data to the network node 110 directly, in inactive state, and the wireless device 131, 132 may send the data to the network node 110 with the proviso that the wireless device 131, 132 holds a second connection to the network node 110; the second connection may be a direct connection.

In some examples, one of the following may apply:

the refraining in this Action 1205 may be further based on the wireless device 131, 132, e.g., the first wireless device 131, being out of coverage of any cell, and the wireless device 131, 132, e.g., the first wireless device 131 may hold the second connection to the network node 110.

In some examples, the first indication may be a configuration received from the network node 110.

The configuration may configure the wireless device 131, 132 to transmit data to the network node 110, e.g., in inactive state.

The size of the buffer comprising the data may be smaller than the threshold.

In some examples, the wireless device 131, 132 may refrain from sending the data based on the first indication having been deconfigured from the wireless device 131, 132 by the network node 110, e.g., by receiving a deconfiguration instruction from the network node 110.

In some examples, the method may further comprise one or more of the following four actions:

Optionally, receiving 1203 a second indication. The wireless device 131, 132 may be configured to perform the receiving in this Action 1203, e.g., by means of a receiving unit 1303 within the wireless device 131, 132, configured to perform this action.

The receiving of the second indication may be from the network node 110, e.g., via the second link 142, and/or via the first link 141 and the third link 143.

The second indication may indicate that the first indication, previously configured at the wireless device 131, 132 is not to be used. The second indication may be one of explicit and implicit.

Determining 1204 to perform one of: i) discarding the received first indication, and ii) storing the received first indication. The wireless device 131, 132 may be configured to perform the determining in this Action 1204, e.g., by means of a determining unit 1304 within the wireless device 131, 132, configured to perform this action.

The determining in this Action 1204 may be optionally based on the received second indication.

Determining may be understood as calculating, deriving or similar.

Optionally, sending 1206 a third indication. The wireless device 131, 132 may be configured to perform the sending in this Action 1206, e.g., by means of a sending unit 1305 within the wireless device 131, 132, configured to perform this action.

The sending of the third indication may be to the network node 110, e.g., via the second link 142, and/or via the first link 141 and the third link 143.

The third indication may indicate an acknowledgement of receipt of the second indication.

Sending 1207 a fourth indication. The wireless device 131, 132 may be configured to perform the sending in this Action 1207, e.g., by means of the sending unit 1305 within the wireless device 131, 132, configured to perform this action.

The sending of the fourth indication may be to the network node 110, e.g., via the second link 142, and/or via the first link 141 and the third link 143.

The fourth indication may indicate, e.g., based on a result of the determination, that the wireless device 131, 132 has one of: discarded and stored the first indication.

In some examples, one or more criteria for transmission of the data may be fulfilled.

In some examples, such as examples of these later examples, the method may further comprise one or more of the following two actions:

Performing 1208 random access. The wireless device 131, 132 may be configured to perform the performing in this Action 1208, e.g., by means of a performing unit 1306 within the wireless device 131, 132, configured to perform this action.

The random access may be towards the network node 110, e.g., via one of: a) a second connection to the network node 110, the second connection being a direct connection, e.g., via the second link 142, and b) via the first connection with the second wireless device 132, e.g., via the first link 141 and the third link 143.

Sending 1209 the data. The wireless device 131, 132 may be configured to perform the sending in this Action 1209, e.g., by means of the sending unit 1305 within the wireless device 131, 132, configured to perform this action.

The sending of the data may be to the network node 110, e.g., via the second link 142, and/or via the first link 141 and the third link 143. The sending of the data in this Action 1209 may be in connected mode, as a result of having performed the random access.

In some examples, the wireless device 131, 132 may perform the random access via the direct second connection.

In some examples, such as examples of these later examples, the method may further comprise one or more of the following two actions:

Sending 1210 a fifth indication. The wireless device 131, 132 may be configured to perform the sending in this Action 1210, e.g., by means of the sending unit 1305 within the wireless device 131, 132, configured to perform this action.

The sending of the fifth indication may be to the network node 110, e.g., via the second link 142, and/or via the first link 141 and the third link 143.

The fifth indication may indicate, e.g., that the first connection is to be released.

Releasing 1211 the first connection. The wireless device 131, 132 may be configured to perform the releasing in this Action 211, e.g. by means of a releasing unit 1307 within the first wireless device 131, configured to perform this action.

The releasing of the first connection may be based on, e.g., performed after, sending the fifth indication.

Sending 1201 a prior indication. The first wireless device 131 may be configured to perform the sending in this Action 1201, e.g., by means of the sending unit 1305 within the wireless device 131, 132, configured to perform this action.

The sending of the prior indication may be to the network node 110, e.g., via the second link 142, and/or via the first link 141 and the third link 143.

The prior indication may indicate, that the wireless device 131, 132 holds the first connection with the network node 110.

In some examples, the wireless device 131, 132 may be the first wireless device 131, e.g., a remote wireless device. In such examples, the another wireless device 131, 132 may be the second wireless device 132, e.g., a relay wireless device.

In other examples, the wireless device 131, 132 may be the second wireless device 132, e.g., a relay wireless device. In such examples, the another wireless device 131, 132 may be the first wireless device 131, e.g., a remote wireless device.

Examples of these actions, messages and the indications have been provided earlier in this document.

Other units 1308 may be comprised in the wireless device 131, 132.

The wireless device 131, 132 may also be configured to communicate user data with a host application unit in a host computer 1510, e.g., via another link such as 1550.

Figure 13:
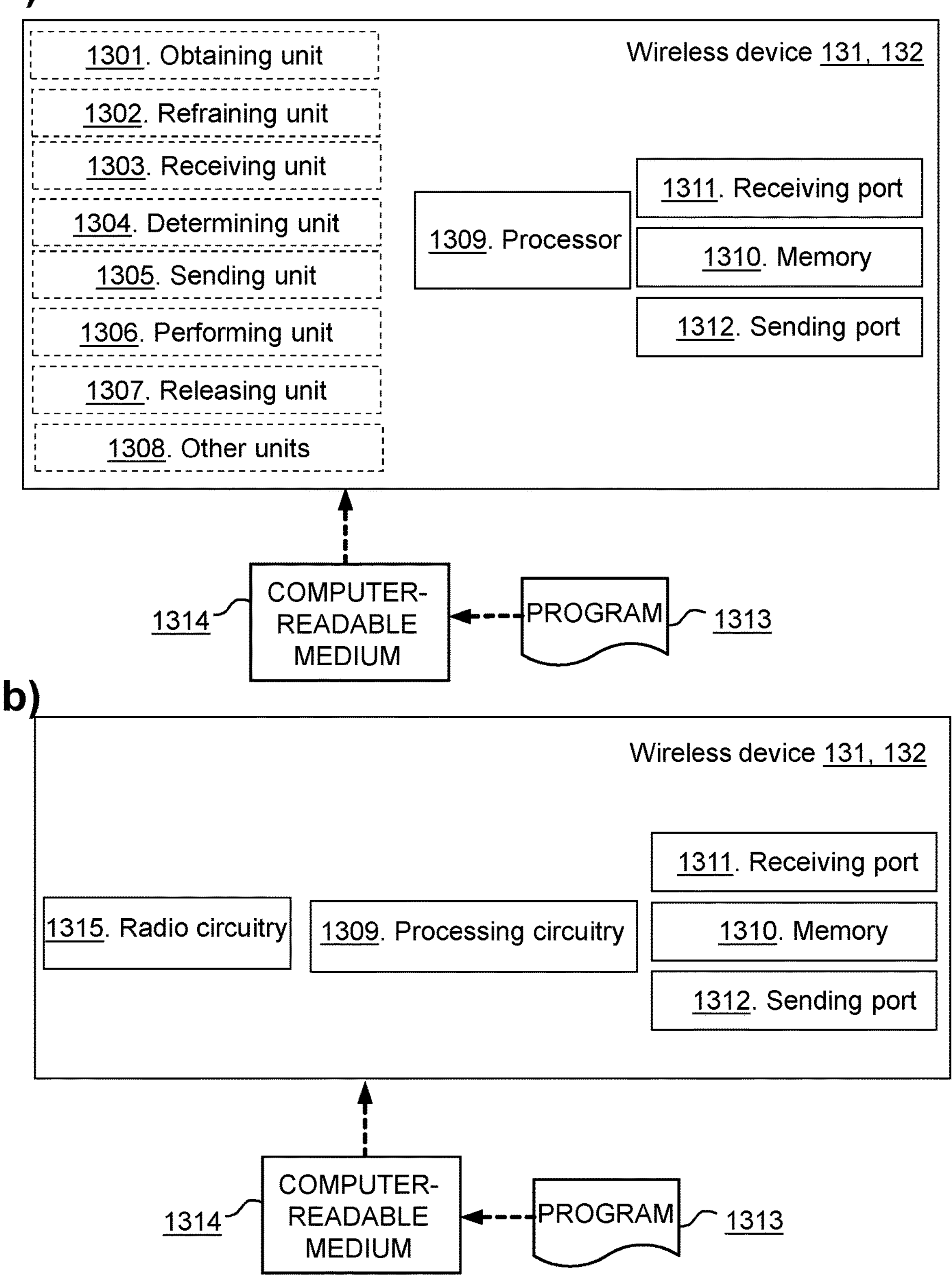
FIG. 13 is a schematic block diagram illustrating two non-limiting examples, a) and b), of a wireless device, according to embodiments herein.

In FIG. 13, optional units are indicated with dashed boxes.

Figure 15:
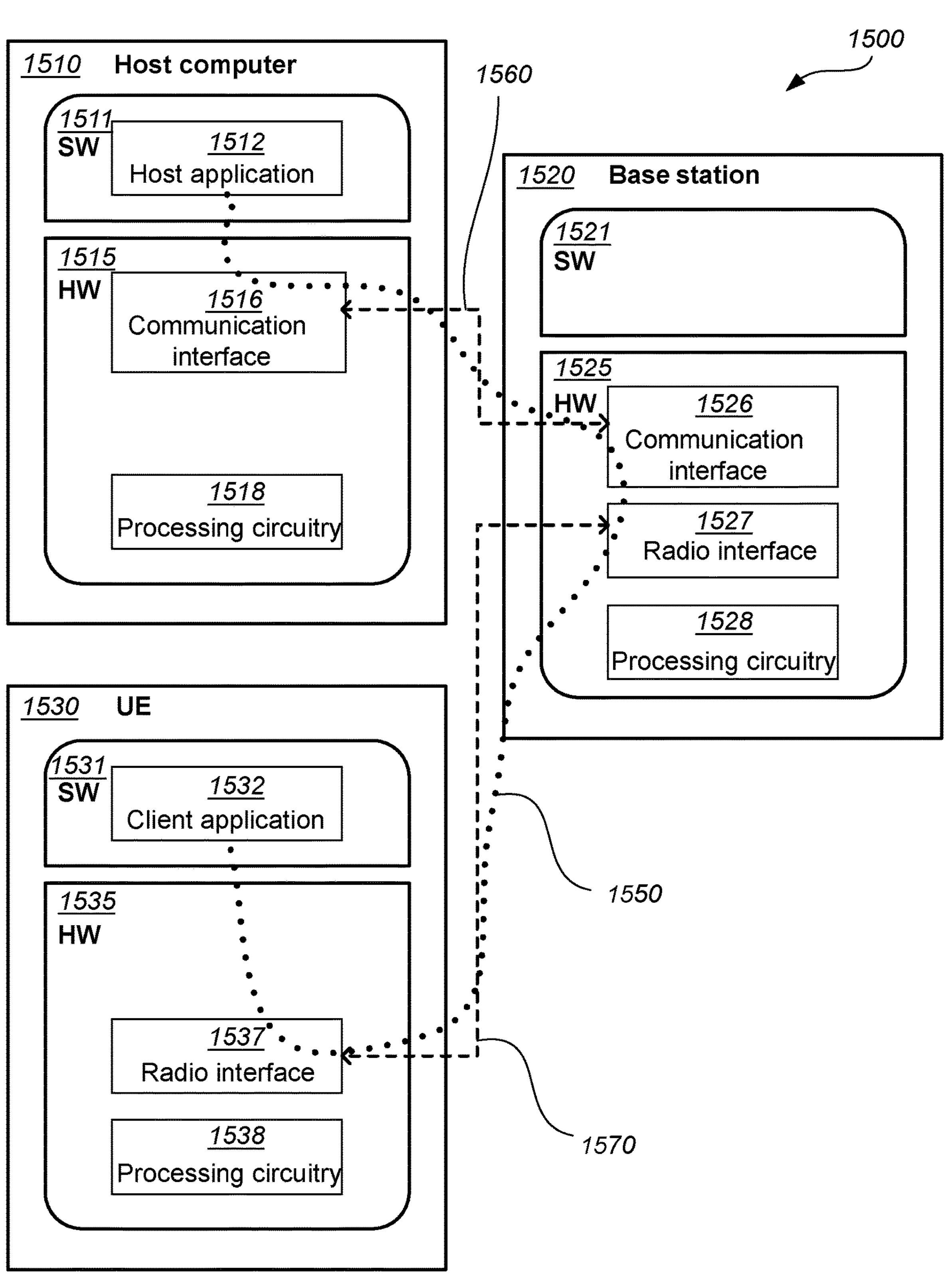
FIG. 15 is a generalized block diagram of a host computer communicating via a base station with a user equipment over a partially wireless connection, according to embodiments herein.

The wireless device 131, 132 may comprise an arrangement as shown in FIG. 13 or in FIG. 15.

FIG. 13 depicts two different examples in panels a) and b), respectively, of the arrangement that the wireless device 131, 132 may comprise. In some examples related to embodiments herein, the wireless device 131, 132 may comprise the following arrangement depicted in FIG. 13*a*.

The examples related to embodiments herein in the wireless device 131, 132 may be implemented through one or more processors, such as a processor 1309 in the wireless device 131, 132 depicted in FIG. 13*a*, together with computer program code for performing the functions and actions of the examples related to embodiments herein. A processor, as used herein, may be understood to be a hardware component. The program code mentioned above may also be provided as a computer program product, for instance in the form of a data carrier carrying computer program code for performing the examples related to embodiments herein when being loaded into the wireless device 131, 132. One such carrier may be in the form of a CD ROM disc. It is however feasible with other data carriers such as a memory stick. The computer program code may furthermore be provided as pure program code on a server and downloaded to the wireless device 131, 132.

The wireless device 131, 132 may further comprise a memory 1310 comprising one or more memory units. The memory 1310 is arranged to be used to store obtained information, store data, configurations, schedulings, and applications etc. to perform the methods herein when being executed in the wireless device 131, 132.

In some examples, the wireless device 131, 132 may receive information from, e.g., the network node 110, the another wireless device 131, 132 and/or another node, through a receiving port 1311. In some examples, the receiving port 1311 may be, for example, connected to one or more antennas in wireless device 131, 132. In other examples, the wireless device 131, 132 may receive information from another structure in the wireless communications network 100 through the receiving port 1311. Since the receiving port 1311 may be in communication with the processor 1309, the receiving port 1311 may then send the received information to the processor 1309. The receiving port 1311 may also be configured to receive other information.

The processor 1309 in the wireless device 131, 132 may be further configured to transmit or send information to e.g., the network node 110, the another wireless device 131, 132, another node, and/or another structure in the wireless communications network 100, through a sending port 1312, which may be in communication with the processor 1309, and the memory 1310.

Those skilled in the art will also appreciate that the units 1301-1308 described above may refer to a combination of analog and digital circuits, and/or one or more processors configured with software and/or firmware, e.g., stored in memory, that, when executed by the one or more processors such as the processor 1309, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some examples, the different units 1301-1308 described above may be implemented as one or more applications running on one or more processors such as the processor 1309.

Thus, the methods according to the examples described herein for the wireless device 131, 132 may be respectively implemented by means of a computer program 1313 product, comprising instructions, i.e., software code portions, which, when executed on at least one processor 1309, cause the at least one processor 1309 to carry out the actions described herein, as performed by the wireless device 131, 132. The computer program 1313 product may be stored on a computer-readable storage medium 1314. The computer-readable storage medium 1314, having stored thereon the computer program 1313, may comprise instructions which, when executed on at least one processor 1309, cause the at least one processor 1309 to carry out the actions described herein, as performed by the wireless device 131, 132. In some examples, the computer-readable storage medium 1314 may be a non-transitory computer-readable storage medium, such as a CD ROM disc, or a memory stick. In other examples, the computer program 1313 product may be stored on a carrier containing the computer program 1313 just described, wherein the carrier is one of an electronic signal, optical signal, radio signal, or the computer-readable storage medium 1314, as described above.

The wireless device 131, 132 may comprise a communication interface configured to facilitate communications between the wireless device 131, 132 and other nodes or devices, e.g., the network node 110, the another wireless device 131, 132, another node, and/or another structure in the wireless communications network 100. The interface may, for example, include a transceiver configured to transmit and receive radio signals over an air interface in accordance with a suitable standard.

In other examples, the wireless device 131, 132 may comprise the following arrangement depicted in FIG. 13*b*. The wireless device 131, 132 may comprise a processing circuitry 1309, e.g., one or more processors such as the processor 1309, in the wireless device 131, 132 and the memory 1310. The wireless device 131, 132 may also comprise a radio circuitry 1315, which may comprise e.g., the receiving port 1311 and the sending port 1312. The processing circuitry 1309 may be configured to, or operable to, perform the method actions according to FIG. 12, and/or FIGS. 15-19, in a similar manner as that described in relation to FIG. 13*a*. The radio circuitry 1315 may be configured to set up and maintain at least a wireless connection with the network node 110, the another wireless device 131, 132, another node, and/or another structure in the wireless communications network 100. Circuitry may be understood herein as a hardware component.

Hence, examples herein also relate to the wireless device 131, 132 operative to operate in the wireless communications network 100. The wireless device 131, 132 may comprise the processing circuitry 1309 and the memory 1310, said memory 1310 containing instructions executable by said processing circuitry 1309, whereby the wireless device 131, 132 is further operative to perform the actions described herein in relation to the wireless device 131, 132, e.g., in FIG. 12 and/or FIGS. 15-19.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e., meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

Further Extensions and Variations

Figure 14:
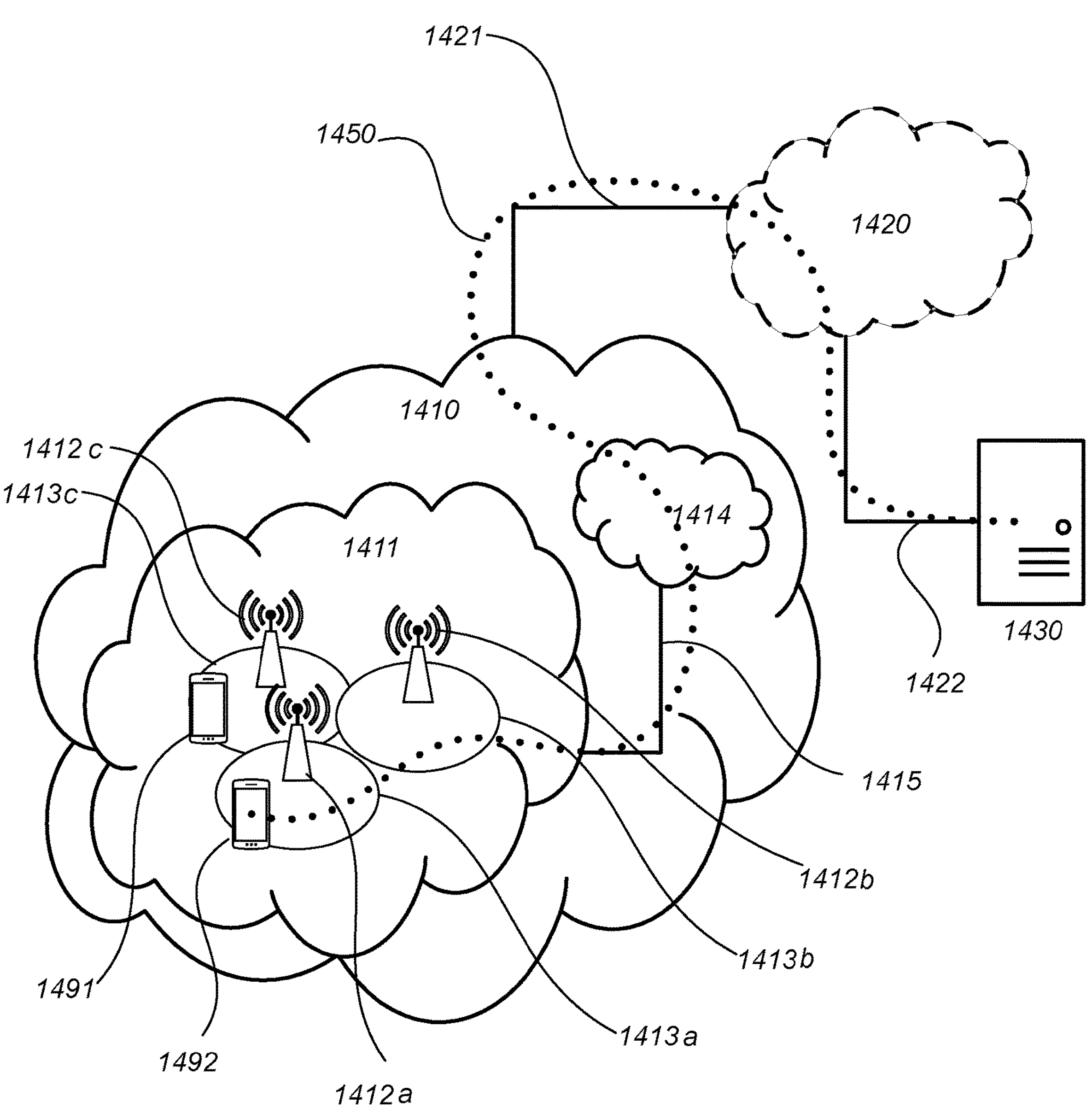
FIG. 14 is a schematic block diagram illustrating a telecommunication network connected via an intermediate network to a host computer, according to embodiments herein.

FIG. 14: Telecommunication Network Connected Via an Intermediate Network to a Host Computer in Accordance with Some Embodiments With reference to FIG. 14, in accordance with an embodiment, a communication system includes telecommunication network 1410 such as the wireless communications network 100, for example, a 3GPP-type cellular network, which comprises access network 1411, such as a radio access network, and core network 1414. Access network 1411 comprises a plurality of network nodes such as the network node 110. For example, base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A plurality of wireless devices, such as the first wireless device 131 and/or the second wireless device 132 are comprised in the wireless communications network 100. In FIG. 14, a first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412. Any of the UEs 1491, 1492 are examples of the first wireless device 131 and/or the second wireless device 132.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

In relation to FIGS. 15, 16, 17, 18, and 19, which are described next, it may be understood that a UE is an example of the first wireless device 131 and/or the second wireless device 132, and that any description provided for the UE equally applies to the first wireless device 131 and/or the second wireless device 132. It may be also understood that the base station is an example of the network node 110, and that any description provided for the base station equally applies to the network node 110.

FIG. 15: Host Computer Communicating Via a Base Station with a User Equipment Over a Partially Wireless Connection in Accordance with Some Embodiments Example implementations, in accordance with an embodiment, of the first wireless device 131 and/or the second wireless device 132, e.g., a UE, the network node 110, e.g., a base station and host computer discussed in the preceding paragraphs will now be described with reference to FIG. 15. In communication system 1500, such as the wireless communications network 100, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes the network node 110, exemplified in FIG. 15 as a base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with the first wireless device 131 and/or the second wireless device 132, exemplified in FIG. 15 as a UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

The wireless device embodiments relate to FIG. 8, FIG. 10 and FIGS. 15-19.

The first wireless device 131 may also be configured to communicate user data with a host application unit in a host computer 1510, e.g., via another link such as 1550.

The first wireless device 131 may comprise an arrangement as shown in FIG. 10 or in FIG. 15.

The network node embodiments relate to FIG. 9, FIG. 11 and FIGS. 15-19.

The network node 110 may also be configured to communicate user data with a host application unit in a host computer 1510, e.g., via another link such as 1550.

The network node 110 may comprise an arrangement as shown in FIG. 11 or in FIG. 15.

Figures 16, 17:
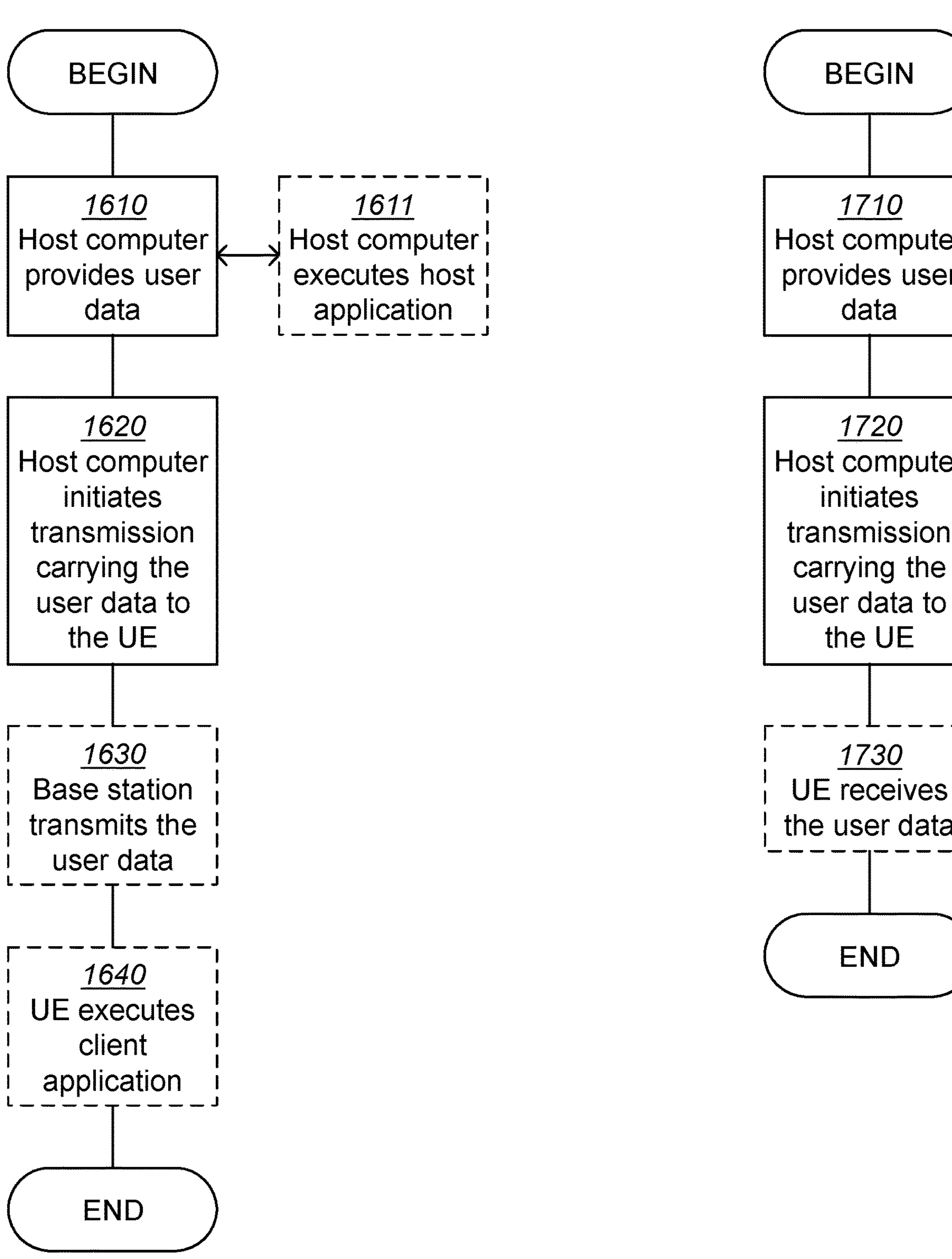
FIG. 16 is a flowchart depicting embodiments of a method in a communications system including a host computer, a base station and a user equipment, according to embodiments herein.
FIG. 17 is a flowchart depicting embodiments of a method in a communications system including a host computer, a base station and a user equipment, according to embodiments herein.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 18:
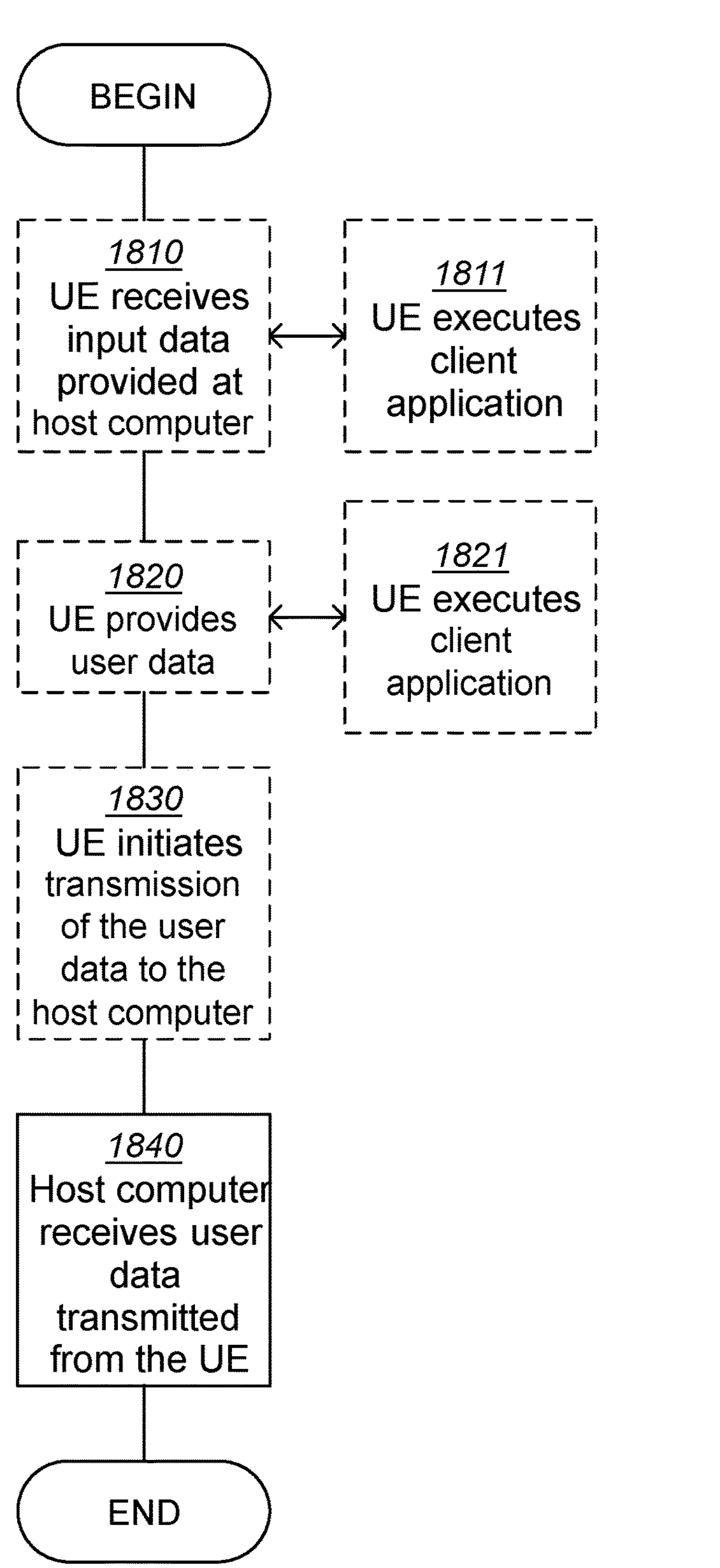
FIG. 18 is a flowchart depicting embodiments of a method in a communications system including a host computer, a base station and a user equipment, according to embodiments herein.

FIG. 18: Methods Implemented in a Communication System Including a Host Computer, a Base Station and a User Equipment in Accordance with Some Embodiments FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 19:
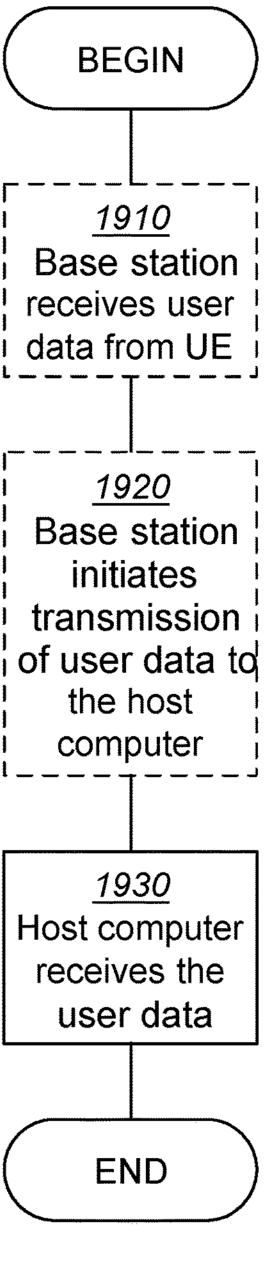
FIG. 19 is a flowchart depicting embodiments of a method in a communications system including a host computer, a base station and a user equipment, according to embodiments herein.

FIG. 19: Methods Implemented in a Communication System Including a Host Computer, a Base Station and a User Equipment in Accordance with Some Embodiments FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

FURTHER NUMBERED EMBODIMENTS

1. A base station configured to communicate with a user equipment (UE), the base station comprising a radio interface and processing circuitry configured to perform one or more of the actions described herein as performed by the network node 110.

5. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform one or more of the actions described herein as performed by the network node 110.

6. The communication system of embodiment 5, further including the base station.

7. The communication system of embodiment 6, further including the UE, wherein the UE is configured to communicate with the base station.

8. The communication system of embodiment 7, wherein:

the processing circuitry of the host computer is configured to execute a host application, thereby providing the user data; and the UE comprises processing circuitry configured to execute a client application associated with the host application.

11. A method implemented in a base station, comprising one or more of the actions described herein as performed by the network node 110.

15. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs one or more of the actions described herein as performed by the network node 110.

16. The method of embodiment 15, further comprising:

at the base station, transmitting the user data.

17. The method of embodiment 16, wherein the user data is provided at the host computer by executing a host application, the method further comprising:

at the UE, executing a client application associated with the host application.

21. A user equipment (UE) configured to communicate with a base station, the UE comprising a radio interface and processing circuitry configured to perform one or more of the actions described herein as performed by the first wireless device 131 and/or the second wireless device 132.

25. A communication system including a host computer comprising:

processing circuitry configured to provide user data; and a communication interface configured to forward user data to a cellular network for transmission to a user equipment (UE), wherein the UE comprises a radio interface and processing circuitry, the UE's processing circuitry configured to perform one or more of the actions described herein as performed by the first wireless device 131 and/or the second wireless device 132.

26. The communication system of embodiment 25, further including the UE.

27. The communication system of embodiment 26, wherein the cellular network further includes a base station configured to communicate with the UE.

28. The communication system of embodiment 26 or 27, wherein:

the processing circuitry of the host computer is configured to execute a host application, thereby providing the user data; and the UE's processing circuitry is configured to execute a client application associated with the host application.

31. A method implemented in a user equipment (UE), comprising one or more of the actions described herein as performed by the first wireless device 131 and/or the second wireless device 132.

35. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs one or more of the actions described herein as performed by the first wireless device 131 and/or the second wireless device 132.

36. The method of embodiment 35, further comprising:

at the UE, receiving the user data from the base station.

41. A user equipment (UE) configured to communicate with a base station, the UE comprising a radio interface and processing circuitry configured to perform one or more of the actions described herein as performed by the first wireless device 131 and/or the second wireless device 132.

45. A communication system including a host computer comprising:

a communication interface configured to receive user data originating from a transmission from a user equipment (UE) to a base station, wherein the UE comprises a radio interface and processing circuitry, the UE's processing circuitry configured to: perform one or more of the actions described herein as performed by the first wireless device 131 and/or the second wireless device 132.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:

the processing circuitry of the host computer is configured to execute a host application; and the UE's processing circuitry is configured to execute a client application associated with the host application, thereby providing the user data.

49. The communication system of embodiment 46 or 47, wherein:

the processing circuitry of the host computer is configured to execute a host application, thereby providing request data; and the UE's processing circuitry is configured to execute a client application associated with the host application, thereby providing the user data in response to the request data.

51. A method implemented in a user equipment (UE), comprising one or more of the actions described herein as performed by the first wireless device 131 and/or the second wireless device 132.

52. The method of embodiment 51, further comprising:

providing user data; and forwarding the user data to a host computer via the transmission to the base station.

55. A method implemented in a communication system including a host computer, a base station and a user equipment (UE), the method comprising:

at the host computer, receiving user data transmitted to the base station from the UE, wherein the UE performs one or more of the actions described herein as performed by the first wireless device 131 and/or the second wireless device 132.

56. The method of embodiment 55, further comprising:

at the UE, providing the user data to the base station.

57. The method of embodiment 56, further comprising:

at the UE, executing a client application, thereby providing the user data to be transmitted; and at the host computer, executing a host application associated with the client application.

58. The method of embodiment 56, further comprising:

at the UE, executing a client application; and at the UE, receiving input data to the client application, the input data being provided at the host computer by executing a host application associated with the client application, wherein the user data to be transmitted is provided by the client application in response to the input data.

61. A base station configured to communicate with a user equipment (UE), the base station comprising a radio interface and processing circuitry configured to perform one or more of the actions described herein as performed by the network node 110.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110.

66. The communication system of embodiment 65, further including the base station.

67. The communication system of embodiment 66, further including the UE, wherein the UE is configured to communicate with the base station.

68. The communication system of embodiment 67, wherein:

the processing circuitry of the host computer is configured to execute a host application;

the UE is configured to execute a client application associated with the host application, thereby providing the user data to be received by the host computer.

71. A method implemented in a base station, comprising one or more of the actions described herein as performed by the network node 110.

75. A method implemented in a communication system including a host computer, a base station and a user equipment (UE), the method comprising:

at the host computer, receiving, from the base station, user data originating from a transmission which the base station has received from the UE, wherein the UE performs one or more of the actions described herein as performed by the first wireless device 131 and/or the second wireless device 132.

76. The method of embodiment 75, further comprising:

at the base station, receiving the user data from the UE.

77. The method of embodiment 76, further comprising:

at the base station, initiating a transmission of the received user data to the host computer.

The invention claimed is:

1. A method performed by a first wireless device configured to operate in a wireless communications network, the method comprising:

while in an inactive state and holding a first indirect connection via a second wireless device to a network node of the wireless communication network, obtaining a first indication of a trigger to transmit data to the network node, wherein a size of a buffer comprising the data is smaller than a threshold; and based on the first wireless device holding the first direct connection to the network node via the second wireless device, refraining from sending the data to the network node via the second wireless device while in the inactive state.

2. The method according to claim 1, wherein one of the following applies:

the method further comprises refraining from sending the data to the network node via a direct second connection while in the inactive state; or refraining from sending the data to the network node via the second wireless device while in the inactive state is further based on the first wireless device holding no direct second connection to the network node, and the method further comprises sending the data to the network node via the direct second connection, when the first wireless device holds the direct second connection to the network node.

3. The method according to claim 2, wherein refraining from sending the data to the network node via the second wireless device while in the inactive state is based on one or more of the following:

the first indication having been deconfigured from the first wireless device by the network node, and the first wireless device being out of coverage of any cell.

4. The method according to claim 1, wherein:

the first indication is received from the network node as part of a configuration for transmitting data to the network node in the inactive state; and refraining from sending the data to the network node via the second wireless device while in the inactive state is further based on receiving, from the network node, an explicit or implicit second indication that the configuration, comprising the first indication, is not to be used by the first wireless device.

5. The method according to claim 1, wherein the method further comprises, when one or more criteria for transmission of the data are fulfilled:

performing random access towards the network node via the second direct connection or via the first indirect connection via the second wireless device, and after entering a connected state as a result of the random access, sending the data to the network node.

6. The method according to claim 5, wherein the random access is performed via the direct second connection and the method further comprises, after sending the data:

sending, to the network node or the second wireless device, a further indication that the first connection is to be released; and releasing the first connection, based on the further indication.

7. A method performed by a network node configured to operate in a wireless communications network, and the method comprising:

while a first wireless device is in an inactive state and holds a first indirect connection to the network node via a second wireless device, preventing the first wireless device from sending data to the network node while in the inactive state, when a size of a buffer comprising the data is smaller than a threshold.

8. The method according to claim 7, wherein preventing the first wireless device from sending data to the network node while in the inactive state comprises one of the following:

refraining from sending to the first wireless device a first indication of a trigger to transmit the data to the network node in the inactive state, or sending the first indication to the wireless device and subsequently sending to the first wireless device an explicit or implicit second indication that the first indication is not to be used by the first wireless device.

9. The method according to claim 7, further comprising, when one or more criteria for transmission of the data by the UE are fulfilled:

performing random access with the first wireless device via the second direct connection or via the first indirect connection via the second wireless device; and after the first wireless device enters a connected state as a result of the random access, receiving the data from the first wireless device.

10. The method according to claim 9, wherein the random access is performed via the direct second connection and the method further comprises, after receiving the data, receiving from the first wireless device a further indication that the first connection is to be released.

11. A first wireless device configured to operate in a wireless communications network, the first wireless device comprising:

radio circuitry configured to communicate with a second wireless device and with a network node of the wireless communication network; and processing circuitry operable coupled to the radio circuitry, wherein the processing circuitry and the radio circuitry are configured to:

while in an inactive state and holding a first indirect connection via a second wireless device to a network node of the wireless communication network, obtain a first indication of a trigger to transmit data to the network node, wherein a size of a buffer comprising the data is smaller than a threshold; and based on the first wireless device holding the first direct connection to the network node via the second wireless device, refrain from sending the data to the network node via the second wireless device while in the inactive state.

12. The first wireless device according to claim 11, wherein one of the following applies:

the processing circuitry and the radio circuitry are further configured to refrain from sending the data to the network node via a direct second connection while in the inactive state; or the processing circuitry and the radio circuitry are configured to refrain from sending the data to the network node via the second wireless device while in the inactive state further based on the first wireless device holding no direct second connection to the network node, and the processing circuitry and the radio circuitry are further configured to send the data to the network node via the direct second connection, when the first wireless device holds the direct second connection to the network node.

13. The first wireless device according to claim 12, wherein the processing circuitry and the radio circuitry are configured to refrain from sending the data to the network node via the second wireless device while in the inactive state based on one or more of the following:

the first indication having been deconfigured from the first wireless device by the network node, and the first wireless device being out of coverage of any cell.

14. The first wireless device according to claim 11, wherein:

the first indication is received from the network node as part of a configuration for transmitting data to the network node in the inactive state; and the processing circuitry and the radio circuitry are configured to refrain from sending the data to the network node via the second wireless device while in the inactive state further based on receiving, from the network node, an explicit or implicit second indication that the configuration, comprising the first indication, is not to be used by the first wireless device.

15. The first wireless device according to claim 11, wherein the processing circuitry and the radio circuitry are further configured to, when one or more criteria for transmission of the data are fulfilled:

perform random access towards the network node via the second direct connection or via the first indirect connection via the second wireless device, and after the first wireless device enters a connected state as a result of the random access, send the data to the network node.

16. The first wireless device according to claim 15, wherein the random access is performed via the direct second connection and the processing circuitry and the radio circuitry are further configured to, after the data is sent:

send, to the network node or the second wireless device, a further indication that the first connection is to be released; and release the first connection, based on the further indication.

17. A network node configured to operate in a wireless communications network, the network node comprising:

radio circuitry configured to communicate with first and second wireless devices; and processing circuitry operable coupled to the radio circuitry, wherein the processing circuitry and the radio circuitry are configured to:

while the first wireless device is in an inactive state and holds a first indirect connection to the network node via the second wireless device, prevent the first wireless device from sending data to the network node while in the inactive state, when a size of a buffer comprising the data is smaller than a threshold.

18. The network node according to claim 17, wherein the processing circuitry and the radio circuitry are configured to prevent the first wireless device from sending data to the network node while in the inactive state based on one of the following:

refrain from sending to the first wireless device a first indication of a trigger to transmit the data to the network node in the inactive state, or send the first indication to the wireless device and subsequently send to the first wireless device an explicit or implicit second indication that the first indication is not to be used by the first wireless device.

19. The network node according to claim 17, wherein the processing circuitry and the radio circuitry are further configured to, when one or more criteria for transmission of the data by the UE are fulfilled:

perform random access with the first wireless device via the second direct connection or via the first indirect connection via the second wireless device; and after the first wireless device enters a connected state as a result of the random access, receive the data from the first wireless device.

20. The network node according to claim 19, wherein the random access is performed via the direct second connection and the processing circuitry and the radio circuitry are further configured to, after receiving the data, receive from the first wireless device a further indication that the first connection is to be released.

* * * * *